(12) United States Patent
Ueda et al.

(10) Patent No.: US 12,137,106 B2
(45) Date of Patent: Nov. 5, 2024

(54) ANALYSIS SYSTEM, METHOD, AND PROGRAM

(71) Applicant: NEC Corporation, Tokyo (JP)

(72) Inventors: Hirofumi Ueda, Tokyo (JP); Yoshinobu Ohta, Tokyo (JP); Tomohiko Yagyu, Tokyo (JP); Norio Yamagaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 268 days.

(21) Appl. No.: 17/641,506

(22) PCT Filed: Sep. 27, 2019

(86) PCT No.: PCT/JP2019/038323
§ 371 (c)(1),
(2) Date: Mar. 9, 2022

(87) PCT Pub. No.: WO2021/059518
PCT Pub. Date: Apr. 1, 2021

(65) Prior Publication Data
US 2022/0311786 A1 Sep. 29, 2022

(51) Int. Cl.
*H04L 9/40* (2022.01)
(52) U.S. Cl.
CPC ...... *H04L 63/1416* (2013.01); *H04L 63/1425* (2013.01); *H04L 63/1433* (2013.01); *H04L 63/1466* (2013.01)
(58) Field of Classification Search
None
See application file for complete search history.

(56) References Cited

U.S. PATENT DOCUMENTS

| | | | |
|---|---|---|---|
| 11,252,175 B2* | 2/2022 | Hassanzadeh | G06F 21/56 |
| 11,288,376 B2* | 3/2022 | Tsai | G06F 21/563 |

(Continued)

FOREIGN PATENT DOCUMENTS

| | | |
|---|---|---|
| JP | 2008-257577 A | 10/2008 |
| JP | 2014-130502 A | 7/2014 |

(Continued)

OTHER PUBLICATIONS

Miller et al. "Supply Chain Attack Framework and Attack Patterns" Mitre (Year: 2013).*

(Continued)

*Primary Examiner* — Younes Naji

(57) ABSTRACT

Provided is an analysis system that can analyze the degree of impact of vulnerability on individual systems. An analysis unit 6 generates an attack pattern that includes an attack condition, an attack result, an attack means that is vulnerability that is used by an attack, and a segment where the attack can occur in a system to be diagnosed. A calculation unit 12 calculates an evaluation value, for each vulnerability, which indicates degree of impact of the vulnerability on the system to be diagnosed. Specifically, the calculation unit 12 calculates the evaluation value, for each vulnerability, based on the number of the attack patterns that include the vulnerability focused on as the attack means and the number of the segments indicated by each attack pattern that includes the vulnerability focused on as the attack means.

7 Claims, 19 Drawing Sheets

(56) References Cited

U.S. PATENT DOCUMENTS

| | | | | |
|---|---|---|---|---|
| 2017/0213037 A1* | 7/2017 | Toledano | ............... | H04L 63/06 |
| 2017/0318053 A1* | 11/2017 | Singh | ................ | H04L 63/1425 |
| 2019/0236661 A1* | 8/2019 | Hogg | ............... | G06Q 30/0641 |
| 2019/0268366 A1* | 8/2019 | Zeng | .................... | G06N 3/047 |
| 2020/0244698 A1* | 7/2020 | Pal | ..................... | H04L 63/1466 |
| 2020/0320191 A1* | 10/2020 | Asai | ..................... | G06F 21/554 |

FOREIGN PATENT DOCUMENTS

| | | |
|---|---|---|
| JP | 2016-091402 A | 5/2016 |
| JP | 2016-143299 A | 8/2016 |
| JP | 2016-170568 A | 9/2016 |
| WO | 2019/093059 A1 | 5/2019 |

OTHER PUBLICATIONS

Miao et al. "Software Assessment Method Based on Relevance Vulnerability" 11th International Conference on Computation Intelligence and Security. (Year: 2015).*
Japanese Office Action for JP Application No. 2021-548290, mailed on Mar. 28, 2023 with English Translation.
International Search Report for PCT Application No. PCT/JP2019/038323, mailed on Nov. 12, 2019.
English translation of Written opinion for PCT Application No. PCT/JP2019/038323, mailed on Nov. 12, 2019.
Information-Technology Promotion Agency, Japan, "Common Vulnerability Assessment System: CVSS Overview", [online] May 31, 2018 [retrieval date Oct. 25, 2019], <Internet: https:www.ipa.go.jp/security/1un/CVSS.html>, sections 2.3,3.3, pp. 1-8.

* cited by examiner

FIG. 3

| No. | CVSS | IDENTIFICATION INFORMATION | VULNERABILITY NAME | COUNTERMEASURE | NECESSITY OF AUTHENTICATION FOR ATTACK | DEVICE HAVING VULNERABILITY |
|---|---|---|---|---|---|---|
| 1 | IMPORTANT | CVE-YYYY-1111 | DEFAULT COMMUNITY NAME | A | UNNECESSARY | Host 1, Host 2 Host 3, Host 4 |
| 2 | IMPORTANT | CVE-YYYY-2222 | VULNERABILITY IN SOFTWARE A | B | UNNECESSARY | Host 1, Host 2 Host 4 |
| 3 | IMPORTANT | CVE-YYYY-3333 | BUFFER OVERFLOW IN SOFTWARE B | C | NECESSARY | Host 3, Host 4 |
| 4 | IMPORTANT | CVE-YYYY-4444 | VULNERABILITY IN OS | D | NECESSARY | Host 4 |

FIG. 5

```
ARBITRARY CODE EXECUTION (attacker, DstHost, administrative privileges){
  –NETWORK CONNECTION (SrcHost, DstHost, http, 80)
  –VULNERABILITY (DstHost, CVEID, 'software 1', remote, privileges escalation)
  –ACCESS (attacker, SrcHost, administrator)
  –RULE NAME ('exec01')
}
```

FIG. 6

| PATTERN NUMBER | ATTACK CONDITION | ATTACK RESULT | PATTERN OVERVIEW | USER INVOLVEMENT | ATTACK MEANS | SEGMENT |
|---|---|---|---|---|---|---|
| 1 | ARBITRARY CODE EXECUTION/ GENERAL PRIVILEGES | DATA TAMPERING / ADMINISTRATIVE PRIVILEGES | [DESCRIPTION OF ATTACK PATTERN (PREDEFINED)] | YES | CVE-2010-000x CVE-2010-000y | S1, S2 |
| 2 | ARBITRARY CODE EXECUTION/ GENERAL PRIVILEGES | DATA TAMPERING / ADMINISTRATIVE PRIVILEGES | [DESCRIPTION OF ATTACK PATTERN (PREDEFINED)] | YES | SMB | S1, S2 |
| 3 | ARBITRARY CODE EXECUTION/ ADMINISTRATIVE PRIVILEGES | ARBITRARY CODE EXECUTION/ ADMINISTRATIVE PRIVILEGES | [DESCRIPTION OF ATTACK PATTERN (PREDEFINED)] | YES | ArpSpoofing | S1, S2, S3, S4 |

FIG. 7

| PATTERN NUMBER | ATTACK CONDITION | ATTACK RESULT | PATTERN OVERVIEW | USER INVOLVEMENT | ATTACK MEANS | SEGMENT |
|---|---|---|---|---|---|---|
| 1 | ARBITRARY CODE EXECUTION/ GENERAL PRIVILEGES | DATA TAMPERING / ADMINISTRATIVE PRIVILEGES | [DESCRIPTION OF ATTACK PATTERN (PREDEFINED)] | YES | | |
| 2 | ARBITRARY CODE EXECUTION/ GENERAL PRIVILEGES | DATA TAMPERING / ADMINISTRATIVE PRIVILEGES | [DESCRIPTION OF ATTACK PATTERN (PREDEFINED)] | YES | | |
| 3 | ARBITRARY CODE EXECUTION/ ADMINISTRATIVE PRIVILEGES | ARBITRARY CODE EXECUTION/ ADMINISTRATIVE PRIVILEGES | [DESCRIPTION OF ATTACK PATTERN (PREDEFINED)] | YES | ArpSpoofing | |
| . . . | . . . | . . . | . . . | . . . | | |

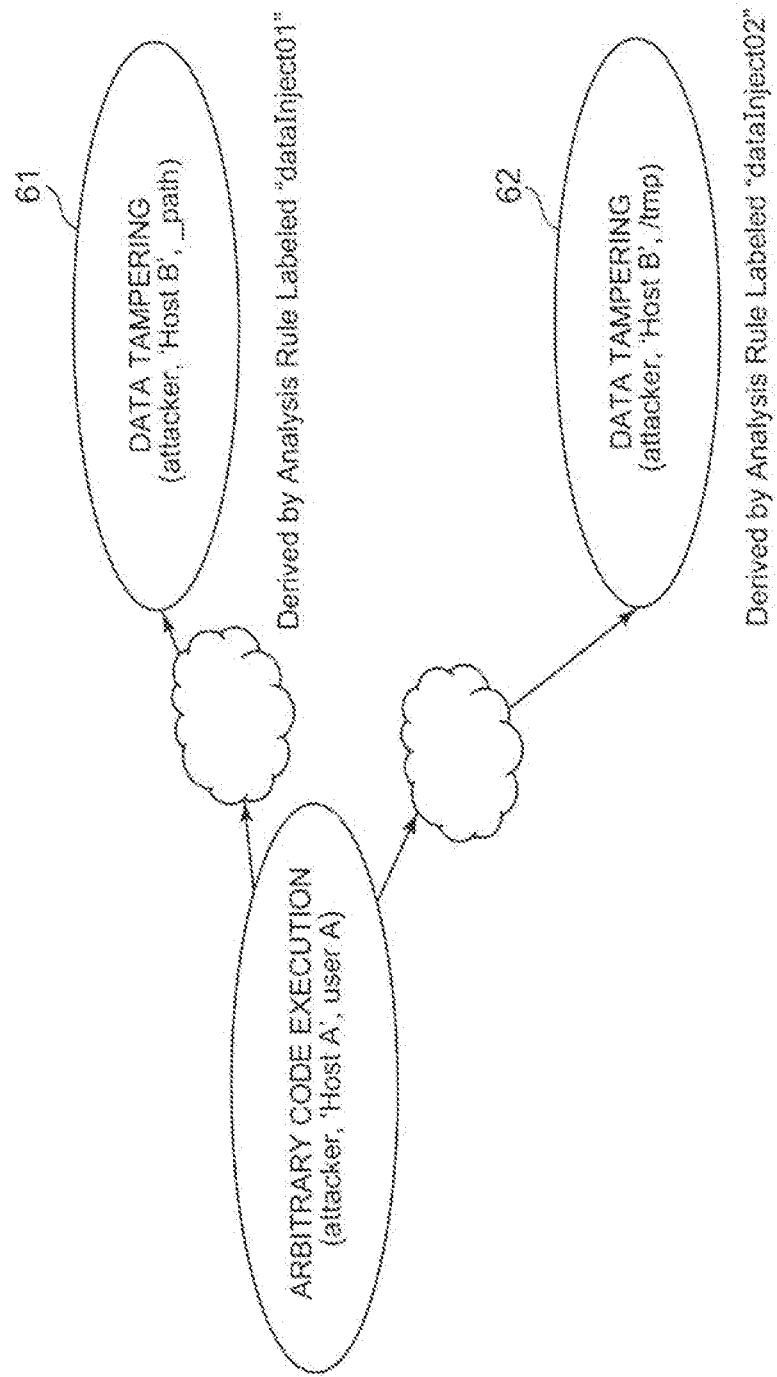

FIG. 9

```
DATA TAMPERING (attacker, DstHost, _path){
  -VULNERABILITY (DstHost, CVEID, Program, remote, data tampering)
  -ACCESS (attacker, DstHost, User)
  -RULE NAME (dataInject01')
}
```

FIG. 10

```
DATA TAMPERING (attacker, DstHost, Path){
  -DATA SHARING (SrcHost, Program, Flow, User)
  -DATA FLOW (SrcHost, DstHost, Flow)
  -DATA ACCESS (Flow, DstHost, Path)
  -ACCESS (attacker, DstHost, User)
  -RULE NAME ((dataInject02)
}
```

FIG. 11

| PATTERN NUMBER | ATTACK CONDITION | ATTACK RESULT | ATTACK MEANS | SEGMENT |
|---|---|---|---|---|
| P1 | DATA TAMPERING / GENERAL PRIVILEGES | DATA TAMPERING / GENERAL PRIVILEGES | CVE-YYYY-1111, CVE-YYYY-2222 | S1, S3 |
| P2 | DATA TAMPERING / ADMINISTRATIVE PRIVILEGES | DATA TAMPERING / ADMINISTRATIVE PRIVILEGES | CVE-YYYY-1111, CVE-YYYY-3333 | S2, S3 |
| P3 | ARBITRARY CODE EXECUTION/ ADMINISTRATIVE PRIVILEGES | ARBITRARY CODE EXECUTION/ ADMINISTRATIVE PRIVILEGES | CVE-YYYY-1111, CVE-YYYY-2222, CVE-YYYY-4444 | S4 |

FIG. 12

| No. | CVSS | EVALUATION VALUE | IDENTIFICATION INFORMATION | VULNERABILITY NAME | COUNTERMEASURE | NECESSITY OF AUTHENTICATION FOR ATTACK | DEVICE HAVING VULNERABILITY |
|---|---|---|---|---|---|---|---|
| 1 | IMPORTANT | 12 | CVE-YYYY-1111 | DEFAULT COMMUNITY NAME | A | UNNECESSARY | Host 1, Host 2 Host 3, Host 4 |
| 2 | IMPORTANT | 6 | CVE-YYYY-2222 | VULNERABILITY IN SOFTWARE A | B | UNNECESSARY | Host 1, Host 2 Host 4 |
| 3 | IMPORTANT | 2 | CVE-YYYY-3333 | BUFFER OVERFLOW IN SOFTWARE B | C | NECESSARY | Host 3, Host 4 |
| 4 | IMPORTANT | 1 | CVE-YYYY-4444 | VULNERABILITY IN OS | D | NECESSARY | Host 4 |

FIG. 16

| NO. | CVSS | EVALUATION VALUE | IDENTIFICATION INFORMATION | VULNERABILITY NAME | COUNTERMEASURE | NECESSITY OF AUTHENTICATION FOR ATTACK | DEVICE HAVING VULNERABILITY | SEGMENT |
|---|---|---|---|---|---|---|---|---|
| 1 | IMPORTANT | 12 | CVE-YYYY-1111 | DEFAULT COMMUNITY NAME | A | UNNECESSARY | Host 1, Host 2, Host 3, Host 4 | S1, S2, S3, S4 |
| 2 | IMPORTANT | 6 | CVE-YYYY-2222 | VULNERABILITY IN SOFTWARE A | B | UNNECESSARY | Host 1, Host 2, Host 4 | S1, S3, S4 |
| 3 | IMPORTANT | 2 | CVE-YYYY-3333 | BUFFER OVERFLOW IN SOFTWARE B | C | NECESSARY | Host 3, Host 4 | S3 |
| 4 | IMPORTANT | 1 | CVE-YYYY-4444 | VULNERABILITY IN OS | D | NECESSARY | Host 4 | S4 |

FIG. 17

| NO. | CVSS | EVALUATION VALUE | IDENTIFICATION INFORMATION | VULNERABILITY NAME | COUNTERMEASURE | NECESSITY OF AUTHENTICATION FOR ATTACK | DEVICE HAVING VULNERABILITY | SEGMENT |
|---|---|---|---|---|---|---|---|---|
| 1 | IMPORTANT | 12 | CVE-YYYY-1111 | DEFAULT COMMUNITY NAME | A | UNNECESSARY | Host 1, Host 2, Host 3, Host 4 | S1, S2, S3, S4 |
| 2 | IMPORTANT | 6 | CVE-YYYY-2222 | VULNERABILITY IN SOFTWARE A | B | UNNECESSARY | Host 1, Host 2, Host 4 | S1, S3, S4 |
| 3 | IMPORTANT | 2 | CVE-YYYY-3333 | BUFFER OVERFLOW IN SOFTWARE B | C | NECESSARY | Host 3, Host 4 | S3 |
| 4 | IMPORTANT | 1 | CVE-YYYY-4444 | VULNERABILITY IN OS | D | NECESSARY | Host 4 | S4 |

…

ANALYSIS SYSTEM, METHOD, AND PROGRAM

This application is a National Stage Entry of PCT/JP2019/038323 filed on Sep. 27, 2019, the contents of all of which are incorporated herein by reference, in their entirety.

TECHNICAL FIELD

The present invention relates to an analysis system, analysis method, and analysis program for analyzing attacks on systems to be diagnosed.

BACKGROUND ART

An information processing system that includes multiple computers is required to take security measures to protect information assets from cyber attacks. Security measures include assessing the vulnerability of the target system and removing vulnerability as necessary.

CVSS (Common Vulnerability Scoring System) is known as a common method to assess the impact of vulnerability.

Patent literature 1 also describes a device that identifies the number of attack patterns for each vulnerability type and displays an ellipse object representing the vulnerability according to the number of attack patterns.

CITATION LIST

Patent Literatures

PTL 1: Japanese Patent Application Laid-Open No. 2014-130502

SUMMARY OF INVENTION

Technical Problem

The result of the vulnerability evaluation by CVSS represents the impact of the vulnerability itself.

On the other hand, the system configuration of various systems is different from one system to another. Therefore, the result of the vulnerability evaluation by CVSS cannot determine an extent of the impact of the vulnerability on each individual system.

Therefore, the purpose of the present invention is to provide an analysis system, analysis method, and analysis program that can analyze the degree of impact of vulnerability on individual systems.

Solution to Problem

An analysis system according to the present invention comprises an analysis unit which generates an attack pattern that includes an attack condition, an attack result, an attack means that is vulnerability that is used by an attack, and a segment where the attack can occur in a system to be diagnosed, and a calculation unit which calculates an evaluation value, for each vulnerability, which indicates degree of impact of the vulnerability on the system to be diagnosed, wherein the calculation unit calculates the evaluation value, for each vulnerability, based on the number of the attack patterns that include the vulnerability focused on as the attack means and the number of the segments indicated by each attack pattern that includes the vulnerability focused on as the attack means.

In an analysis method according to the present invention, one or more computers generate an attack pattern that includes an attack condition, an attack result, an attack means that is vulnerability that is used by an attack, and a segment where the attack can occur in a system to be diagnosed, and calculate an evaluation value, for each vulnerability, which indicates degree of impact of the vulnerability on the system to be diagnosed, wherein the one or more computers, when calculating the evaluation value for each vulnerability, calculate the evaluation value, for each vulnerability, based on the number of the attack patterns that include the vulnerability focused on as the attack means and the number of the segments indicated by each attack pattern that includes the vulnerability focused on as the attack means.

An analysis program according to the present invention causes a computer to execute an analyzing process of generating an attack pattern that includes an attack condition, an attack result, an attack means that is vulnerability that is used by an attack, and a segment where the attack can occur in a system to be diagnosed, and a calculating process of calculating an evaluation value, for each vulnerability, which indicates degree of impact of the vulnerability on the system to be diagnosed, wherein in the calculating process, the analysis program causes the computer to calculate the evaluation value, for each vulnerability, based on the number of the attack patterns that include the vulnerability focused on as the attack means and the number of the segments indicated by each attack pattern that includes the vulnerability focused on as the attack means.

Advantageous Effects of Invention

According to the present invention, it is possible to analyze the degree of impact of vulnerability on individual systems.

BRIEF DESCRIPTION OF DRAWINGS

FIG. 3 It depicts a diagram showing an example of a table of vulnerability information consisting of records keyed by the identification information of the vulnerability.

FIG. 5 It depicts a diagram showing an example of an analysis rule.

FIG. 6 It depicts a schematic diagram of an example of an attack pattern.

FIG. 7 It depicts a schematic diagram of a pattern table.

FIG. 8 It depicts a schematic diagram showing that facts that are the end points derived from a fact that is the start point are identical, but the processes of deriving the facts that are the end points are different, and the analysis rules used to derive the facts that are the end points are different.

FIG. 9 It depicts a diagram showing an example of an analysis rule.

FIG. 10 It depicts a diagram showing an example of an analysis rule.

FIG. 11 It depicts a diagram showing an example of a generated attack pattern.

FIG. 12 It depicts a schematic diagram showing an example of the display of evaluation values.

FIG. 16 It depicts a schematic diagram showing an example of the display of evaluation values.

FIG. 17 It depicts a schematic diagram showing an example of the display of evaluation values.

DESCRIPTION OF EMBODIMENTS

Figure 1:
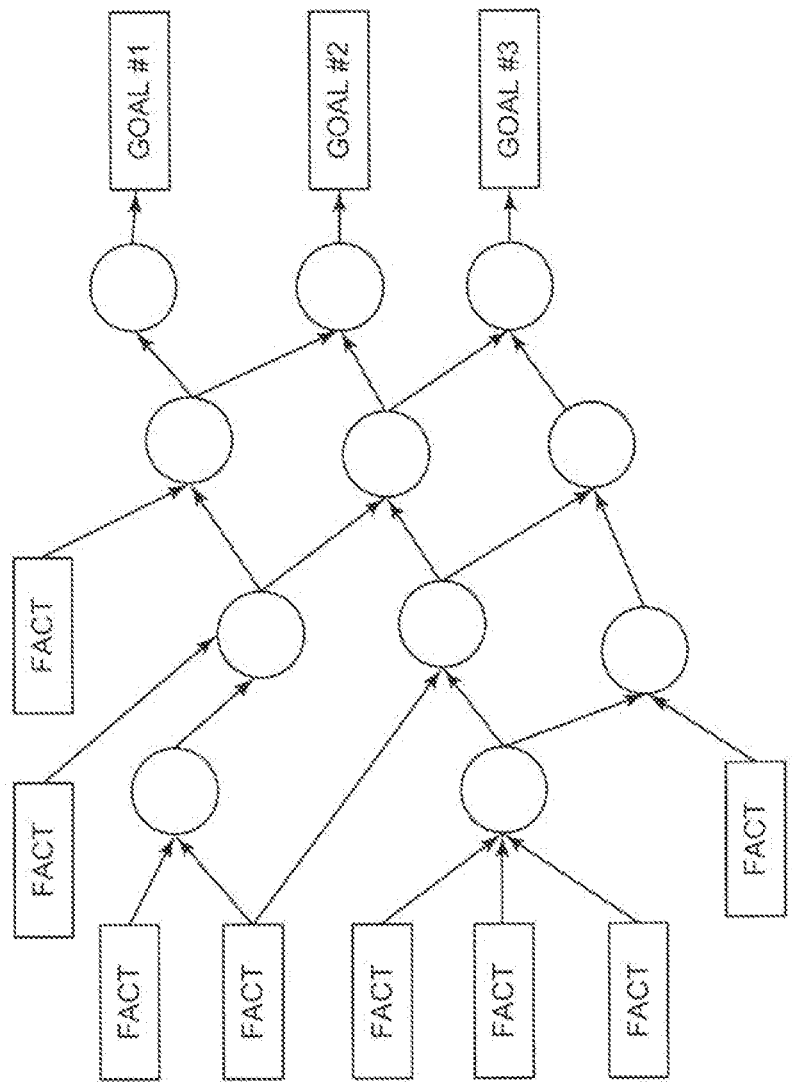
FIG. 1 It depicts a schematic diagram of a general attack graph.

The analysis system described in each of the following example embodiments is a system for analyzing cyber attacks on the system to be diagnosed (assessed). A system to be diagnosed is a system that is a target of security diagnosis. Examples of systems to be diagnosed include information technology (IT) systems in a company and so-called operational technology (OT) systems for controlling a factory, a plant or the like. However, the systems to be diagnosed are not limited to these systems. A system in which multiple devices are connected through a communication network can be a system to be diagnosed.

Each device included in the system to be diagnosed is connected through a communication network. Examples of devices included in the system to be diagnosed include personal computers, servers, switches, routers, machine tools installed in factories, and control devices for machine tools. However, the devices are not limited to the above examples. The devices may be physical devices or virtual devices.

A way to analyze attacks on the system to be diagnosed is to use an attack graph. An attack graph is a graph that can show the state of a device, such as the presence or the absence of vulnerability, and a relationship between an attack that can be executed on one device and an attack that can be executed on other devices based on the attack that can be executed on the one device. An attack graph is represented as a directed graph where any state (device, network, vulnerability, security settings, etc.), that may relate to security, is defined as a fact, the states are nodes, and the relationships between facts are edges.

Here, a fact is data that represents the security situation of the system to be diagnosed. As a more detailed example, a fact represents some state of the system to be diagnosed, or a device included in the system to be diagnosed, that may relate to security mainly. As another detailed example, a fact represents an attack that may be performed on each device included in the system to be diagnosed. In this case, the fact is expressed in the form of a combination of a device and an attack state, or a combination of a device, an attack state and privileges, as described below. In the analysis of attack, it is assumed that some attacks can be carried out on the devices included in the system to be diagnosed. Such an assumption may be treated as a fact.

The facts can be determined from information obtained from each device included in the system to be diagnosed. In addition, a rule for deriving new facts from existing facts (hereinafter, referred to as an analysis rule) can be used to derive a new fact from one or more existing facts. The rules for deriving new facts from existing facts (hereinafter, referred to as analysis rules) can be used to derive new facts from one or more existing facts. For example, a new fact can be derived based on the facts determined from information obtained from each device in the system to be diagnosed, using the analysis rule. Furthermore, another new fact can be derived based on the facts determined from information obtained from each device and a newly obtained fact. This process is repeated until no new fact can be derived from the analysis rule. Then, an attack graph can be generated by setting each fact to a node, connecting each node corresponding to a fact with an edge extending from a node corresponding to the fact that is the basis of a newly obtained fact to the node corresponding to the newly obtained fact.

FIG. 1 a schematic diagram showing an example of a general attack graph obtained in this way. In FIG. 1, nodes represented by rectangles labeled "FACT" represent the facts determined from information obtained from each device. In FIG. 1, nodes represented by circles and nodes represented by rectangles labeled "GOAL" represent facts that are newly derived using the analysis rule. The "GOAL"s in FIG. 1 are a part of the newly derived facts using the analysis rule, and represent the facts that are end points of fact derivations using the analysis rule.

The following analysis system of each example embodiment below generates an attack pattern that includes an attack condition, an attack result, an attack means which is vulnerability used by the attack, and a segment where the attack can occur in the system to be diagnosed. The analysis system then calculates an evaluation value, for each vulnerability, that indicates a degree of an impact of vulnerability to the system to be diagnosed. The attack pattern may include other information. The details of the attack pattern and the segment are described later.

The analysis system of each example embodiment of the invention generates, for example, one or more pairs of a facts that is the start point and a fact that is the end point, and generates an attack pattern for each pair. Note that there may be some pairs for which no attack pattern is generated. However, in each example embodiment of the present invention, the method of generating the attack pattern is not limited to any particular method.

Hereinafter, an example embodiment of the present invention will be described with reference to the drawings.

Figure 2:
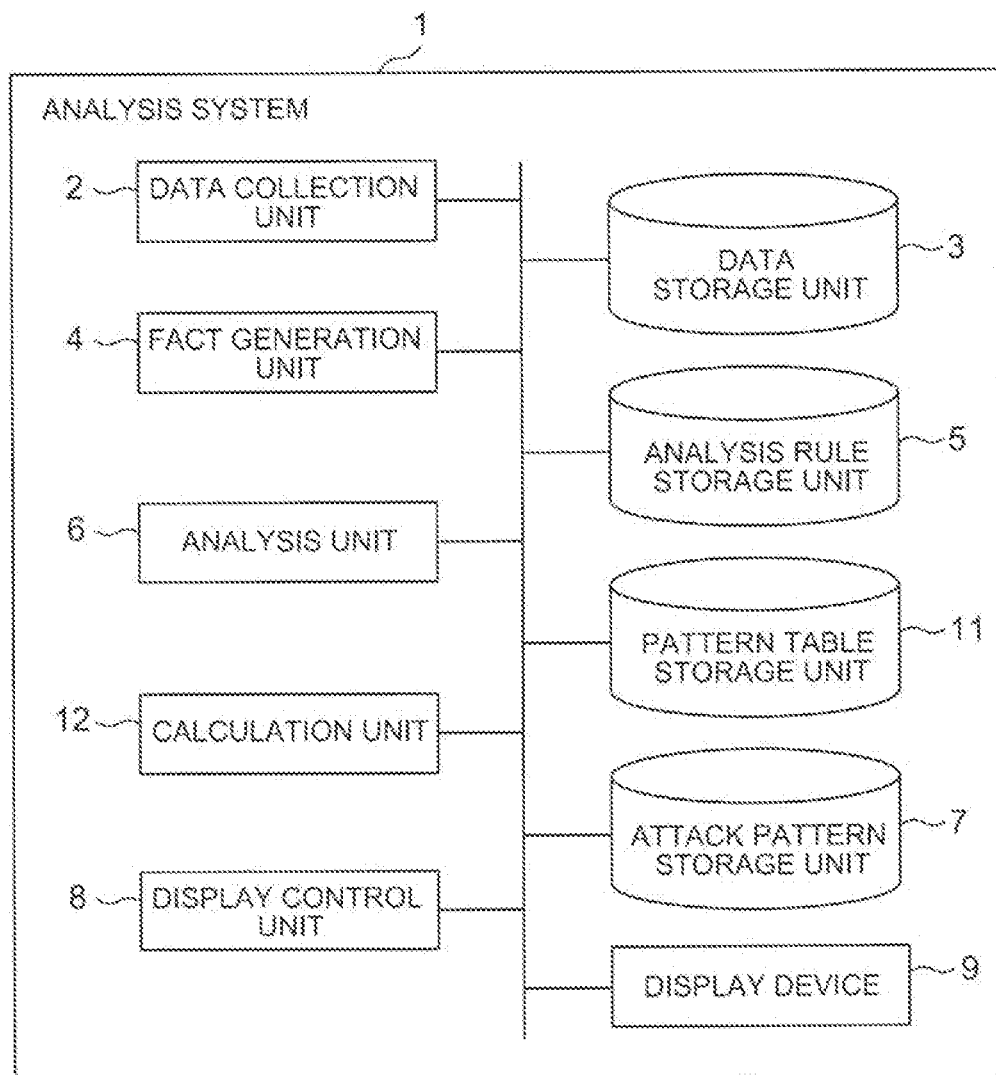
FIG. 2 It depicts a block diagram showing an example of an analysis system of the first example embodiment of the present invention.

FIG. 2 is a block diagram showing an example of the analysis system of the first example embodiment of the present invention. The analysis system 1 of the present example embodiment comprises a data collection unit 2, a data storage unit 3, a fact generation unit 4, an analysis rule storage unit 5, a pattern table storage unit 11, an analysis unit 6, an attack pattern storage unit 7, a calculation unit 12, a display control unit 8, and a display device 9. As mentioned above, the method of generating attack patterns is not limited to any particular method, and the elements included in the analysis system 1 should be in accordance with the method of generating attack patterns. However, the analysis system 1 comprises the calculation unit 12 that calculates an evaluation value, for each vulnerability, that indicates a degree of an impact of vulnerability to the system to be diagnosed, based on the attack pattern. The following explanation is based on the configuration shown in FIG. 2 as an example.

The data collection unit 2 collects information regarding each device included in the system to be diagnosed.

The information regarding the device is information that can be related to the security of the device. Examples of information regarding the device that the data collection unit 2 collects include an operating system (OS) installed on the device and its version information, hardware configuration information installed on the device, software installed on the device and its version information, information on the communication data exchanged between the device and other devices and the communication protocol used to exchange the communication data, information on the status of ports of the device (which ports are open) and so on, for example. The communication data includes information on a source and a destination of the communication data. The data collection unit 2 collects the above information. However, examples of the information collected by the data collection unit 2 are not limited to the above examples. The data collection unit 2 may also collect other information that may be relevant to the security of the device as information regarding the device.

The data collection unit 2 may collect information regarding the devices directly from each device included in the system to be diagnosed. In this case, the analysis system 1 is connected to each device through a communication network, and the data collection unit 2 can collect information from each device through the communication network.

Alternatively, the data collection unit 2 may obtain information regarding each device from an information collection server that collects information regarding each device. In this case, the analysis system 1 is connected to the information collection server through a communication network, and the data collection unit 2 can collect information regarding each device from the information collection server through the communication network.

When each device has an agent, the data collection unit 2 may collect information regarding each device through the agent. In other words, the data collection unit 2 may obtain information regarding each device from the information collection server that collects information regarding each device through the agent.

Each agent installed in each device may transmit information regarding the device to the information collection server, and the data collection unit 2 may collect information regarding each device included in the system to be diagnosed from that information collection server. In this case, for example, the analysis system 1 is connected to the information collection server through a communication network, and the data collection unit 2 may collect information regarding each device from that information collection server through the communication network.

When the data collection unit 2 collects information regarding each device included in the system to be diagnosed, the data collection unit 2 stores the information in the data storage unit 3.

The data storage unit 3 is a storage device that stores the information regarding each device collected by the data collection unit 2.

Further, for each device included in the system to be diagnosed, the data collection unit 2 collects information on vulnerability present in the device based on the information collected from the device. The data collection unit 2 may access a vulnerability database server (not shown) that has a vulnerability information database to collect information on vulnerability, for example. Specifically, the data collection unit 2 transmits software installed on the device and its version information as well as an OS and its version information to the vulnerability database server, and collects identification information of the vulnerability from the vulnerability database server. In this case, the identification information may be identification information such as a common vulnerabilities identifier CVE (Common Vulnerabilities and Exposures) numbered by a security-related organization. The data collection unit 2 may also collect a result of the vulnerability evaluation by CVSS, the name of the vulnerability, a countermeasure against the vulnerability, information on whether or not authentication is required for the attack using the vulnerability, etc., in addition to the identification information of the vulnerability. However, the information that the data collection unit 2 collects for each device as vulnerability information is not limited to the above examples.

The vulnerability information collected by the data collection unit 2 for each device can be put into a table as records keyed by the vulnerability identification information. FIG. 3 shows an example of a table of vulnerability information consisting of records keyed by the vulnerability identification information. From the table shown in FIG. 3, for example, the devices "Host 1", "Host 2", "Host 3" and "Host 4" have vulnerability "CVE-YYYY-1111", and the devices "Host 1", "Host 2" and "Host 4" have vulnerability "CVE-YYYY-2222". "Host 1" etc. shown in FIG. 3 is the device ID.

Based on the vulnerability information collected for each device, the data collection unit 2 generates a table of vulnerability information (refer to FIG. 3) consisting of records keyed by the vulnerability identification information, and stores the table in the data storage unit 3.

The method of collecting vulnerability information is not limited to the above example. For example, the data collection unit 2 may perform an active scan for each device, identify the identification information of vulnerability present in the device, and collect various data from the vulnerability database server using the identification information.

The fact generation unit 4 generates one or more facts based on the information regarding each device collected by the data collection unit 2. As already explained, the fact represents the security situation of the system to be diagnosed. The fact generated by the fact generation unit 4 represents some state mainly related to security of one or more devices included in the system to be diagnosed, derived from the specific information obtained from each device.

For example, the fact generation unit 4 generates one or more facts by referring to the rule for generating facts that include one or more templates representing the facts to be generated, which have been prepared in advance, and determining whether or not the information regarding each device matches the respective template. Information regarding each device is applied to the parameters of the generated facts as appropriate.

Figure 4:
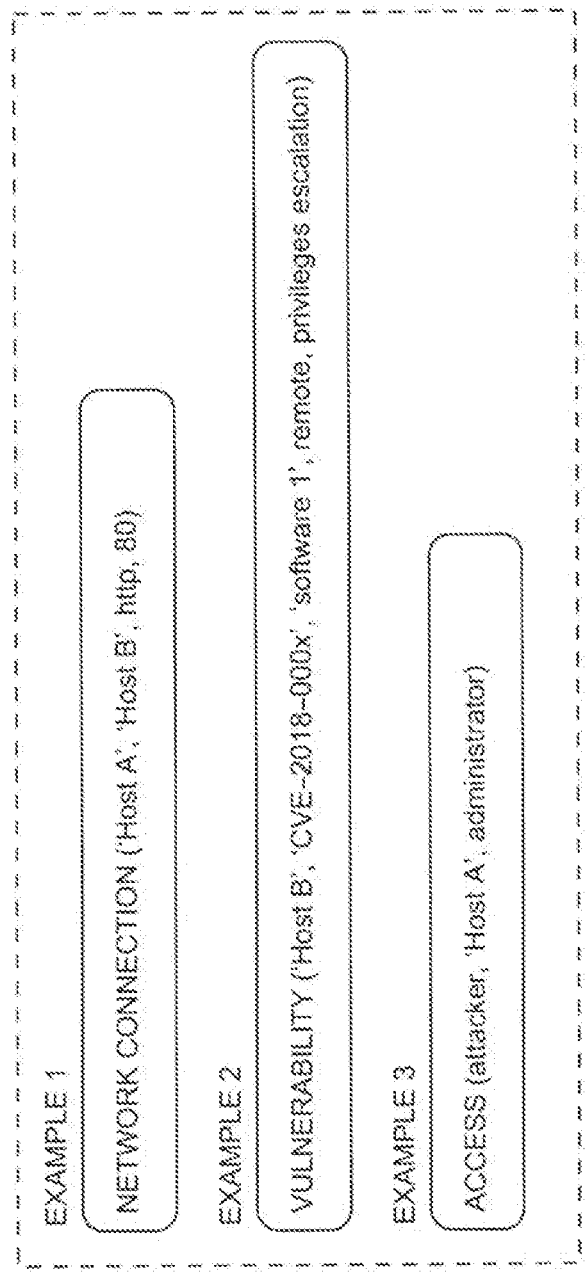
FIG. 4 It depicts a diagram showing an example of a generated fact.

FIG. 4 shows an example of the facts that are generated. Although three facts are shown in FIG. 4, the facts are not limited to the three shown in FIG. 4. The facts necessary for the processing in the analysis unit 6 should be generated accordingly.

In FIG. 4, the parameters shown in single quotation marks are individual specific information regarding the devices in the system to be diagnosed. For example, 'Host A' and 'Host B' in the example shown in FIG. 4 are specific device IDs. The device ID is information that identifies each of the devices included in the diagnostic target. The parameter 'software 1' in the example shown in FIG. 4 is the specific software name installed in the device, and 'CVE-2018-

000x' is the identification information of the specific vulnerability associated with the software. In this case, an identification information such as the common vulnerability identifier CVE numbered by a security-related organization may be used as the identification information. The fact parameter may also include a parameter that represents a wildcard.

The fact shown as Example 1 in FIG. 4 represents the matter "HTTP (HyperText Transfer Protocol) communication from a device 'Host A' to a device 'Host B' if is possible using TCP (Transmission Control Protocol) port 80."

The fact shown as Example 2 in FIG. 4 represents the matter "'software 1' on the device 'Host B' has a vulnerability 'CVE-2018-000x', and the administrative privileges can be obtained by attacking the vulnerability from a remote location."

The fact shown as Example 3 in FIG. 4 represents the matter "the attacker has administrative privileges in device 'Host A'."

The description format of the fact is not limited to the example shown in FIG. 4, but can be in other formats as long as the processing in the analysis unit 6 can be performed.

The analysis rule storage unit 5 is a storage device that stores analysis rules. An analysis rule is a rule for deriving a new fact from an existing fact. The fact derived using the analysis rule is mainly a fact that represents an attack that can be performed on each device included in the system to be diagnosed. The analysis rule storage unit 5 stores one or more analysis rules according to the system to be diagnosed.

FIG. 5 shows an example of an analysis rule. The analysis rule includes at least an element that represents the new fact to be derived and an element that corresponds to the condition. In other words, the analysis rule indicates that a new fact will be derived if there is a fact that matches the condition. In the example shown in FIG. 5, the element in the first line is the element that represents the new fact to be derived. In addition, each element from the second to the fourth line is an element that corresponds to a condition. In the analysis rule shown in FIG. 5, the new fact represented in the first line is derived when there is facts that matches all three conditions. The analysis rule may also include an element representing a label that is uniquely defined for that analysis rule. In the example shown in FIG. 5, the element in line 5 is the element that represents the label uniquely defined for the analysis rule. The element in the fifth line represents that the label of the analysis rule shown in FIG. 5 is "exec01".

In FIG. 5, the parameters enclosed in single quotation marks are individual specific information regarding the device in the system to be diagnosed. For example, 'software 1' in the third line of the condition is the name of the specific software installed in the device. In other words, the condition in the third line is a condition related to the software called 'software 1' installed in the device. In a fact to match a condition that includes such an individual specific parameter, information corresponding to the parameter should be included. In other words, the fact that matches the condition in line 3 is a fact that is associated with the software named 'software 1' installed on the device.

The analysis rules shown in FIG. 5 may also include fixed values, unlike the variables described below. For example, "attacker," "administrative privileges," "http," "80"," "remote," "privileges escalation," and "administrator" shown in FIG. 5 are fixed values. For a fact to match a condition that includes a fixed value as a parameter, information corresponding to that fixed value should be included in the premising fact.

In FIG. 5, parameters that begin with a capital letter are variables. The variable parameters mean that they may be changeable depending on the fact to be matched. In the example shown in FIG. 5, "SrcHost" and "DstHost" are variables. Various information included in the information collected from the device is assigned to the parameters as variables. In a single analysis rule, variables described by the same parameter are assigned to a common value. For example, a common concrete device ID is assigned to the variable "SrcHost" described in the second and fourth lines of FIG. 5. Similarly, a common concrete device ID is assigned to the variable "DstHost" described in the second and third lines of FIG. 5.

In the example shown in FIG. 5, the "CVEID" in the third line represents a wildcard for the vulnerability identification information. In this way, a parameter representing the wildcard may be included in the analysis rule. If a fact is true regardless of the information regarding the device, at least part of the fact may include a parameter representing a wildcard. A parameter representing a wildcard indicates that the information that can be anything is assigned to the parameter.

In the analysis rule shown in FIG. 5, the same information regarding the device is assigned to the same variables included in the conditions. In other words, in the analysis rule shown in FIG. 5, the same information regarding the device is assigned to each of the "SrcHost" and "DstHost" parameters. In the example shown in FIG. 5, if the information regarding the device is applied to the variables as described above, and when there are facts that matches each of the conditions, a new fact represented in the first line is derived. The new fact represented in the first row is the fact that the information regarding the device is assigned to the variable.

The description format of the analysis rules is not limited to the example shown in FIG. 5.

The analysis unit 6 generates an attack pattern for a pair which is possible to derive a fact that is the end point from a fact that is the start point among one or more pairs of a fact that is the start point and a fact that is the end point. As an example, the analysis unit 6 analyzes whether or not it is possible to derive a fact that is the end point from a fact that is the start point. When the fact that is the end point can be derived from the fact that is the start point, then the analysis unit 6 generates an attack pattern. The analysis unit 6 analyzes whether or not it is possible to derive the fact that is the end point from the fact that is the start point using the fact generated from the information regarding the device that is the start point and the device that is the end point, the fact that is the start point, and the analysis rule stored in the analysis rule storage unit 5. In this analysis, the analysis unit 6 does not use facts generated from information regarding devices that do not correspond to either the device that is the start point or the device that is the end point. When it is possible to derive a fact that is the end point from a fact that is the start point, then the pattern table stored in the pattern table storage unit 11 is used to generate the attack pattern. The pattern table will be described later.

The fact that is the start point may be referred to simply as a start point fact. Similarly, the fact that is the end point may be referred to simply as an end point fact.

Each of the fact that is the start point and the fact that is the end point is usually a fact (a fact that represents the possibility of an attack) that represents an attack that can be performed on each device in the system to be diagnosed. In other words, the ability to derive a fact that is the end point from a fact that is the start point indicates that if some attack is possible on the device that is the start point, another attack is possible on the device that is the end point. The inability to derive the fact that is the end point from the fact that is the start point indicates that even if some attack is possible on the device that is the start point, another attack represented by the fact that is the end point cannot be executed on the device fact that is the end point.

An example of an operation to analyze whether or not it is possible to derive a fact that is the end point from a fact that is the start point will be described.

The analysis unit 6 generates one or more pairs of a fact that is the start point of an attack graph and a fact that is the end point of the attack graph. The fact that is the start point and the fact that is the end point are facts that represent an attack that can take place on the device that is the start point and the device that is the end point, respectively.

The analysis unit 6 analyzes whether or not it is possible to derive the fact that is the end point from the fact that is the start point, based on the fact generated from the information regarding the device that is the start point and the device that is the end point, the fact that is the start point, and the analysis rule stored in the analysis rule storage unit 5, for each pair of the fact that is the start point of the attack graph and the fact that is the end point of the attack graph. In this analysis, the analysis unit 6 does not use facts generated from information regarding devices that do not correspond to either the device that is the start point or the device that is the end point.

The fact that is the start point of the attack graph and the fact that is the end point of the attack graph will be described.

There are multiple types of attacks, and the attacks that a device may be subjected to vary depending on the vulnerability the which device has. Therefore, in the example embodiments of the present invention, the state of a device that may be attacked by vulnerability is defined as the attack state. For example, as the attack state, "a state in which code can be executed (hereinafter, referred to as "arbitrary code execution")", "a state in which data can be tampered with (hereinafter, referred to as "data tampering"), "a state in which files can be accessed (hereinafter, referred to as "file accessible")", "a state in which account information has held (hereinafter, referred to as "account holding")", "a state in which a DoS (Denial of Service) attack can be carried out (hereinafter, referred to as "dos")", etc. are given. In the present example embodiment, there are five attack states "arbitrary code execution", "data tampering", "file accessible", "account holding", and "dos" as an example. However, the attack states are not limited to the above five types. Other types of attack states may be given depending on the attacks that may occur in the system to be diagnosed. An attack state that includes multiple attack states may also be defined. For example, an attack state called "all" may be defined as a state that includes all of the attack states "arbitrary code execution", "data tampering", "file accessible", and "account holding".

The analysis unit 6 generates a combination of one of the device IDs of devices included in the system to be diagnosed, one of the multiple predetermined attack states, and one of the privileges that can correspond to the attack states as the fact that is the start point of the attack graph.

Similarly, the analysis unit 6 generates a combination of one of the device IDs of devices included in the system to be diagnosed, one of the multiple predetermined attack states, and one of the privileges that can correspond to the attack states as the fact that is the end point of the attack graph.

Here, "privileges" includes privileges when the attack indicated by the attack state is performed. In this case, the privilege is, for example, either administrative privileges or general privileges. In addition, "privileges" may include the fact that privilege is not relevant when the attack indicated by the attack state is performed (hereinafter, referred to as "no relevant privileges"). Therefore, the predetermined multiple types of privileges are, as an example, "administrative privileges", "general privileges", and "no relevant privileges".

The combination of attack state and privileges can be determined according to the specific content of the attack state. For example, each of the attacks indicated by "arbitrary code execution," "data tampering," "file accessible," and "account holding" can be performed under some privileges, such as administrative or general privileges. Therefore, for each attack state of "arbitrary code execution," "data tampering," "file accessibility," and "account holding" appropriate privileges such as "administrative privileges" or "general privileges" can be combined, depending on the specifics of each attack state. A DoS attack is not related to administrative privileges, general privileges, or other privileges. Therefore, the attack condition "dos" will be combined with "no relevant privileges".

Under such a combination of attack state and privileges, the analysis unit 6 generates a combination of a device corresponding to one of the devices included in the system to be diagnosed, one of the multiple types of attack states, and one of the privileges that can correspond to the attack state, as the fact that is the start point of the attack graph under such a combination of attack states and privileges. Similarly, the analysis unit 6 generates a combination of a device corresponding to one of the devices included in the system to be diagnosed, one of the multiple types of attack states, and one of the multiple types of privileges that can correspond to the attack state, as a fact that is the end point of the attack graph under such a combination of attack states and privileges.

In this way, the combination of "device, attack state, and privileges" is treated as a fact that is the start point of the attack graph or a fact that is the end point of the attack graph. The device included in a fact is represented by a device ID, for example. In other words, each of a fact that is the start point or a fact that is the end point is a fact that indicates possibility under the attack represented by the attack state in the device represented by the device ID.

Furthermore, the analysis unit 6 determines a pair of a fact (a combination of "device, attack state, and privileges") that is the start point of the attack graph and a fact (a combinations of "device, attack state, and privileges") that is the end point of the attack graph. In this case, the analysis unit 6 may exhaustively determine all pairs of facts that are the start points and facts that are the end points in the system to be diagnosed, or some of all pairs. In the case of defining some of all pairs, the analysis unit 6 may determine a pair of the fact that is the start point and the fact that is the end point based on some of the devices included in the system to be diagnosed, such as devices included in a specific subnet in the system to be diagnosed. That is, when the analysis unit 6 generates the fact that is the start point and the fact that is the end point based on some of the devices included in the system to be diagnosed, the analysis unit 6 may regard the devices included in the same subnet of the system to be diagnosed as some of the devices. The analysis unit 6 may also determine the pair of the fact that is the start point and the fact that is the end point by excluding pairs of devices that need to go through other devices for communication, i.e., pairs of devices that cannot communicate directly. In other words, when the analysis unit 6 generates the fact that is the start point and the fact that is the end point based on some of the devices included in the system to be diagnosed, the analysis unit 6 may regard the devices that can communicate directly as some of the devices.

In this case, the analysis unit 6 may determine combinations of the devices that are the start points and the devices that are the end points, and under each combination of devices, determine the fact (a combination of "device, attack state, and privileges") that is the start point and the fact (a combination of "device, attack state, and privileges") that is the end point.

The device included in the fact that is the start point and the device included in the fact that is the end point may be the same device. In this case, the analysis unit 6 can also analyze whether it is possible to reach from one attack state of a device to another attack state, in other words, if a certain attack is possible on a device, whether another attack is possible on the device.

After defining one or more pairs of the fact that is the start point and the fact that is the end point as described above, the analysis unit 6 analyzes, for each pair, whether or not it is possible to derive the fact that is the end point from the fact that is the start point, based on the fact representing the state of each device generated from the information regarding the device that is the start point and the information regarding the device that is the end point, the fact that is the start point, and one or more predetermined analysis rules. In this case, the analysis unit 6 can apply an inference algorithm based on the analysis rule stored in the analysis rule storage unit 5, for example. The device that is the start point is a device indicated by the device ID included in the fact that is the start point, and the device that is the end point is a device indicated by the device ID included in the fact that is the end point. Accordingly, for example, when the device ID in the fact that is the start point is 'Host A' and the device ID in the fact that is the end point is 'Host B', the analysis unit 6 analyzes whether or not it is possible to derive the fact that is the end point based on facts representing states of 'Host A' and 'Host B' generated from information regarding device 'Host A' and information regarding device 'Host B'. Therefore, the analysis unit 6 can analyze whether or not it is possible to derive a fact that is the end point from a fact that is the start point for the focused pair, without deriving facts related to devices other than the device that is the start point and the device that is the end point or deriving the same facts repeatedly. In other words, by restricting facts to be referenced as described above, the analysis unit 6 can analyze whether or not it is possible to derive a fact that is the end point from a fact that is the start point without deriving redundant facts.

At the time of starting the analysis of whether or not it is possible to derive a fact that is the end point by focusing on a single pair, the analysis unit 6 regards a fact generated from the information regarding the device that is the start point and the information regarding the device that is the end point, and the fact that is the start point as the existing facts. The analysis unit 6 does not include facts generated by the fact generation unit 4 from information regarding devices other than the device that is the start point and device that is the end point to the existing facts. The analysis unit 6 determines whether or not a fact that matches the condition of the analysis rule is included in the existing facts. Then, the analysis unit 6 derives a new fact based on the analysis rules when the respective facts that match the respective conditions included in the analysis rule exist in the existing facts.

The analysis unit 6 adds the derived new fact to the existing facts. The analysis unit 6 repeats this operation. The analysis unit 6 determines that it is possible to derive a fact that is the end point from a fact that is the start point when the derived new fact matches the fact that is the end point in the focused pair.

Hereinafter, a more detailed explanation of an example of the operation of the analysis unit 6 to derive new facts will be described, referring to the analysis rule illustrated in FIG. 5 as an example. The analysis unit 6 determines whether or not there is a fact that matches the condition by contrasting each of the conditions included in the analysis rule with each of the existing facts obtained at that point in time. For the fixed value parameters among the conditions included in the analysis rule, the analysis unit 6 determines whether or not a fact matching the condition exists in the existing facts by determining whether or not the fixed value parameter included in the condition matches the corresponding fixed value in the existing facts. For the parameters of the variables, the analysis unit 6 assigns the value included in the existing fact to the condition as it is. Then, the analysis unit 6 derives a new fact if the fact that matches the condition is included in the existing facts.

For example, assume that the existing facts include the three facts illustrated in FIG. 4. Then, assume that the analysis unit 6 derives a new fact using the analysis rule illustrated in FIG. 5. In this case, the fixed value parameters included in each condition of the analysis rule shown in FIG. 5 match the fixed value parameters included in the fact shown in FIG. 4. Therefore, in this case, the analysis unit 6 assign 'Host B' to the variable 'DstHost' in the first line shown in FIG. 5 to derive "arbitrary code execution (attacker, 'Host B', administrative privileges)" as a new fact. Then, the analysis unit 6 adds the new fact to the existing facts. This new fact represents the matter "The attacker is able to execute code on device 'Host B' with administrative privileges". In other words, from the three facts illustrated in FIG. 4, the matter "The attacker is able to execute code on device 'Host B' with administrative privileges" is derived.

When the conditions included in the analysis rule do not match the existing facts, the analysis unit 6 will not derive a new fact based on the analysis rule. This means that the fact represented by the analysis rule will not be derived when the existing fact is premised.

The analysis unit 6 performs the same process for each analysis rule.

The analysis unit 6 repeats derivation of new facts until a new fact corresponds to the fact that is the end point in the pair that is being focused on. If the fact that is the end point in the focused pair is not obtained even after repeating the derivation of new facts until no new fact can be derived, the analysis unit 6 determines that the fact that is the end point cannot be derived from the fact that is the start point for the focused pair. This corresponds to the matter where no attack occurs on the device that is the end point due to the attack state on the device that is the start point.

The analysis unit 6 may use other methods to analyze whether it is possible to derive the fact that is the end point from the fact that is the start point. In this case, when the analysis unit 6 is able to determine that the fact that is the end point cannot be derived from the fact that is the start point, the analysis unit 6 may terminate the analysis for the pair.

Next, generation of attack patterns will be described. When the analysis unit 6 determines that it is possible to derive a fact that is the end point from the fact that is the start point, the analysis unit 6 generates an attack pattern for the pair of facts. The attack pattern is information that includes at least an attack condition, an attack result, and an attack means. Assuming that the attack pattern includes not only the attack condition, the attack result, and the attack means, but also the segment where the attack can occur in the system to be diagnosed, the present example embodiment will be described. Here, the attack condition is a pair of the attack state and privileges at the start point, and the attack result is a pair of the attack state and privileges at the end point. The attack means is vulnerability that an attacker uses to attack. An attack means such as ArpSpoofing etc., for example, may be described as an attack means. The attack pattern may include information other than an attack condition, an attack result and an attack means.

FIG. 6 is a schematic diagram of an example of an attack pattern. In the example shown in FIG. 6, the attack pattern includes a pattern number, an attack condition, an attack result, a pattern overview, user involvement, an attack means, and a segment. Relating the pattern number, the attack condition, the attack result, the pattern overview, and the user involvement are defined in advance in the pattern table stored by the pattern table storage unit 11. In some cases, the attack means are defined in advance for the pair of the attack condition and the attack result. In each record of the pattern table, at least the pattern number, the attack condition, and the attack result are defined.

As mentioned above, the attack condition is a pair of an attack state and privileges at the start point, and the attack result is a pair of an attack state and privileges at the end point. The attack condition can be identified from the attack state and privileges included in the fact that is the start point. The attack result can be identified from the attack state and privileges included in the fact that is the end point.

The pattern overview is a summarized description of the attack pattern. In FIG. 6, the specific contents of the pattern overview are omitted. This is also true for FIG. 7, which shows an example of a pattern table, described below.

The user involvement indicates whether the attack requires an operation by the attacker himself or herself from the local environment, for example, through USB (Universal Serial Bus).

The attack means is vulnerability that an attacker uses to attack. For example, an attack means such as ArpSpoofing may be described as the attack means.

There are two main types of security vulnerabilities. The first is vulnerability caused by software or device (routers, etc.) problems. Information on this vulnerability is collected and classified by various organizations, and the vulnerabilities are numbered accordingly. As an example, in the common vulnerability identifier CVE, an identifier in the form of "CVE-**-**" is assigned to each discovered vulnerability. The second is a vulnerability caused by a protocol specification. Examples of the vulnerability are "FTP (File Transfer Protocol) malicious use", "Telnet malicious use" and "SMB (Server Message Block) malicious use", etc. In the example embodiment of the present invention, the vulnerabilities include the first vulnerability and the second vulnerability.

The segment is a path between a device and other devices in the system to be diagnosed, and a path between a device and itself. To each segment in the system to be diagnosed, identification information is assigned in advance. "S1" and so on, shown as a segment illustrated in FIG. 6, are the identification information of the segment. The path between the device and other devices connected to the device in the system to be diagnosed, and the path between the device and itself, can also be used as segments.

In the attack pattern, an attack means is defined according to the analysis rule used to derive the fact that is the end point. However, the attack means may be predetermined for a pair of an attack state and an attack result.

In the attack pattern, the segment is defined according to the fact that is the start point and the fact that is the end point.

A table in which the attack means defined according to the analysis rule used to derive the fact that is the end point is set to be pending, the segment is set to be pending, and other matters being not pending that are included in the attack pattern are stored is called a pattern table. The pattern table is predetermined and stored in the pattern table storage unit 11.

FIG. 7 is a schematic diagram of an example of a pattern table. In FIG. 7, a blank field indicates that the information is set to be pending. The "ArpSpoofing" shown in FIG. 7 is a predetermined attack means for a pair of an attack state and an attack result.

When the analysis unit 6 determines that it is possible to derive the fact that is the end point from the fact that is the start point, the analysis unit 6 searches the pattern table (refer to FIG. 7) for a record corresponding to the attack state and privileges included in the fact that is the start point, the attack state and privileges included in the fact that is the end point, and the analysis rule used to derive the fact that is the end point. Then, by identifying the pending information in the found record, the attack pattern for the pair of the fact that is the start point and the fact that is the end point is generated.

In the pattern table illustrated in FIG. 7, a pair of the attack condition and the attack result of pattern number "1" and a pair of the attack condition and the attack result of pattern number "2" are common. In other words, there can be multiple records with a common set of an attack condition and an attack result. This means that there are multiple analysis rules used to derive the facts that are the end points that represent the same attack result, and the way the pending information is defined differs depending on the difference in the analysis rules. Each record in the pattern table that has a common set of an attack condition and an attack result is associated with a different analysis rule in advance. Depending on the associated analysis rule, the method of identifying the pending attack means in the record will be different.

FIG. 8 is a schematic diagram showing that facts that are the end points derived from a fact that is the start point are identical, but the processes of deriving the facts that are the end points are different, and the analysis rules used to derive the facts that are the end points are different. FIG. 8 shows an example where the end point of the combination "Host B/data tampering/administrative privileges" is derived from the start point of the combination "Host A/arbitrary code execution/general privileges". However, facts 61 and 62 are facts derived by different analysis rules. The fact 61 is a fact derived by an analysis rule labeled "dataInject01", and the fact 62 is a fact derived by an analysis rule labeled "dataInject02". Here, the analysis rule labeled "dataInject01" is associated with record "1" in the pattern table illustrated in FIG. 7. The analysis rule labeled "dataInject02" is associated with record "2" in the pattern table. Therefore, the method of deriving the attack means is different between record "1" and record "2", which share the same set of an attack condition and an attack result.

FIG. 9 shows an example of an analysis rule labeled "dataInject01". When the analysis rule illustrated in FIG. 9 is used to derive a fact that is the end point, the analysis unit 6 searches for record "1", which is associated with the analysis rule illustrated in FIG. 9, among the records including the attack condition "arbitrary code execution/general privileges" and the attack result "data tampering/administrative privileges". Then, the analysis unit 6 generates a new attack pattern by identifying the attack means and the segment in the record. In the case of identifying the attack means of record "1" associated with the analysis rule illustrated in FIG. 9, the analysis unit 6 may identify the vulnerability identification information assigned to the wildcard "CVEID" (refer to FIG. 9) regarding the vulnerability identification information described in the second line element of the analysis rule when deriving the fact that is the end point. As a result, the analysis unit 6 identifies "CVE-2010-000x", for example, as the attack means for record "1". In addition, the analysis unit 6 may identify identification information of the segment that indicates a route from the device included in the fact that is the start point to the device included in the fact that is the end point, as the segment of record "1".

FIG. 10 shows an example of an analysis rule labeled "dataInject02". When the analysis rule illustrated in FIG. 10 is used to derive the fact that is the end point, the analysis unit 6 searches for record "2", which is associated with the analysis rule illustrated in FIG. 10, among the records including the attack condition "arbitrary code execution/general privileges" and the attack result "data tampering/administrative privileges". Then, the analysis unit 6 generates a new attack pattern by identifying the attack means and the segment in the record. In the case of identifying the attack means for record "2", which is associated with the analysis rule illustrated in FIG. 10, the analysis unit 6 generates a new attack pattern by identifying the attack means and segment for that record. In the case of identifying the attack means of record "2" associated with the analysis rule illustrated in FIG. 10, the analysis unit 6 may identify information assigned to the variable "Flow" (refer to FIG. 10) in the third line element "data flow (SrcHost, DstHost, Flow)" of this analysis rule when deriving the fact that is the end point, and identify the protocol that corresponds to the information. The correspondence between the information assigned to the variable "Flow" and the protocol is known in advance when analyzing whether or not it is possible to derive the fact that is the end point from the fact that is the start point. As a result, the analysis unit 6 identifies "SMB (i.e., malicious use of SMB)", for example, as the attack means for record "2". In addition, the analysis unit 6 may identify identification information of the segment that indicates a route from the device included in the fact that is the start point to the device included in the fact that is the end point, as the segment of record "2".

In the above, examples of the operation of identifying the attack means have been shown, using the analysis rule illustrated in FIG. 9 or in FIG. 10 when deriving the fact that is the end point. However, the operation to identify the attack means is not limited to the above examples. When the analysis unit 6 identifies an attack means for a record in the pattern table that includes the attack condition and the attack result known from the fact that is the start point and the fact that is the end point, and that is associated with the analysis rule used when deriving the fact that is the end point, and that is associated with the analysis rule used for deriving the fact that is the end point, the analysis unit 6 may identify the attack means using the method defined for the analysis rule.

In some cases, such as the record "3" shown in FIG. 7, the attack means (in this case, ArpSpoofing) is defined in advance for the pair of the attack condition and the attack result. If the analysis unit 6 finds such a record, the analysis unit 6 can generate an attack pattern that includes the attack means already defined in that record.

When identifying the segment, the analysis unit 6 may identify the identification information of the segment that shows the path from the device included in the fact that is the start point to the device included in the fact that is the end point.

When the analysis unit 6 determines that it is possible to derive the fact that is the end point from the fact that is the start point, the analysis unit 6 generates an attack pattern that includes the attack state and privileges included in the fact that is the start point, the attack state and privileges included in the fact that is the end point, the decided information included in the record corresponding to the analysis rule used to derive the fact that is the end point, and the attack means and the segment identified described above.

Here, the attack condition included in the generated attack pattern corresponds to the attack state and privileges included in the fact that is the start point, and the attack result included in the attack pattern corresponds to the attack state and privileges included in the fact that is the end point.

The analysis unit 6 generates one or more pairs of a fact that is the start and a fact that is the end point. Therefore, it is possible that the same record may be retrieved from the pattern table multiple times. In such a case, the analysis unit 6 can identify the pending matter in the record each time it is retrieved, and add the newly identified matter to the attack pattern.

FIG. 6 shows an example of an attack pattern generated by the analysis unit 6 as described above.

The analysis unit 6 stores the generated attack pattern in the attack pattern storage unit 7. The attack pattern storage unit 7 is a storage device that stores the attack patterns.

In the following explanation, the case where the analysis unit 6 generates an attack pattern as described above will be explained as an example. However, the analysis unit 6 may generate the attack pattern in other ways. For example, the analysis unit 6 may use a model checker to generate the attack pattern. Alternatively, the analysis unit 6 may generate the attack pattern by analyzing using Petri net.

Based on the attack pattern generated by the analysis unit 6, the calculation unit 12 calculates an evaluation value, for each vulnerability, which indicates the degree of impact of the vulnerability on the system to be diagnosed. The higher the evaluation value of a vulnerability, the greater the impact of the attack on the system to be diagnosed.

The calculation unit 12 calculates the evaluation value without referring to the "pattern overview" and "user involvement" included in the attack pattern. Therefore, in the following explanation, the "pattern overview" and "user involvement" included in the attack pattern are omitted.

FIG. 11 shows an example of the attack patterns generated by the analysis unit 6. In the present example embodiment, the calculation unit 12 calculates the evaluation value, for each vulnerability, based on the number of the attack patterns that include the vulnerability focused on and the number of the segments indicated by each attack pattern that includes the vulnerability focused on as the attack means. Specifically, the calculation unit 12 calculates, for each vulnerability, a product of the number of attack patterns that include the vulnerability focused on and the number of segments indicated by each attack pattern that includes the vulnerability focused on as the attack means, as the evaluation value. If there are multiple segments that are identical, the same segment is counted as one.

Assuming that the attack pattern illustrated in FIG. 11 has been obtained, the example of the calculation of the evaluation value is shown in more detail. First, the example of calculating the evaluation value for vulnerability "CVE-YYYY-1111" will be described. Since the attack patterns that include the vulnerability "CVE-YYYY-1111" as the attack means are "P1", "P2" and "P3", the number of attack patterns that include the vulnerability "CVE-YYYY-1111" as the attack means is three. Since the segments indicated by each of the attack patterns "P1", "P2" and "P3" which include the vulnerability "CVE-YYYY-1111" as the attack means are "S1", "S3", "S2" and "S4", the number of segments is four. Although the segment "S3" appears twice (refer to FIG. 11), it is counted as one, as described above. Therefore, the calculation unit 12 calculates the evaluation value of vulnerability "CVE-YYYY-1111" as 3×4=12.

Next, an example of calculating the evaluation value for vulnerability "CVE-YYYY-2222" will be described. Since the attack patterns that include the vulnerability "CVE-YYYY-2222" as the attack means are "P1" and "P3", the number of attack patterns that include the vulnerability "CVE-YYYY-2222" as the attack means is two. Since the segments indicated by each of the attack patterns "P1" and "P3" which include the vulnerability "CVE-YYYY-2222" as the attack means are "S1", "S3" and "S4", the number of segments is three. Therefore, the calculation unit 12 calculates the evaluation value of vulnerability "CVE-YYYY-2222" as 2×3=6.

Next, an example of calculating the evaluation value for vulnerability "CVE-YYYY-3333" will be described. Since the attack pattern that includes the vulnerability "CVE-YYYY-3333" as the attack means is "P2", the number of attack patterns is one. Since the segments indicated by the attack pattern "P2" which includes the vulnerability "CVE-YYYY-3333" as the attack means are "S2" and "S3", the number of segments is two. Therefore, the calculation unit 12 calculates the evaluation value of vulnerability "CVE-YYYY-3333" as 1×2=2.

Next, an example of calculating the evaluation value for vulnerability "CVE-YYYY-4444" will be described. Since the attack pattern that includes the vulnerability "CVE-YYYY-4444" as the attack means is "P3", the number of attack patterns is one. Since the segment indicated by the attack pattern "P3" which includes the vulnerability "CVE-YYYY-4444" as the attack means is "S2", the number of segments is one. Therefore, the calculation unit 12 calculates the evaluation value of vulnerability "CVE-YYYY-4444" as 1×1=1.

Therefore, in the present example, the evaluation values of the vulnerabilities "CVE-YYYY-1111", "CVE-YYYY-2222", "CVE-YYYY-3333" and "CVE-YYYY-4444" are set to "12", "6", "2" and "1", respectively.

The display control unit 8 displays the calculated evaluation value for each vulnerability on the display device 9. At this time, the display control unit 8 may display the calculated evaluation value for each vulnerability along with the information of each vulnerability collected by the data collection unit 2. For example, as mentioned above, the data collection unit 2 generates a table (refer to FIG. 3) consisting of records keyed by the identification information of the vulnerability, and stores the table in the data storage unit 3. The display control unit 8 may add a column indicating the evaluation value to the table, and display the table indicating the evaluation value on the display device 9. For example, assume that the table illustrated in FIG. 3 is generated by the data collection unit 2, and as described above, the vulnerabilities "CVE-YYYY-1111", "CVE-YYYY-2222", "CVE-YYYY-3333" and "CVE-YYYY-4444" are calculated, respectively. In this case, the display control unit 8 may display on the display device 9 the table illustrated in FIG. 12, with the columns indicating the evaluation values added.

The display device 9 is a device that displays information, and can be a general display device. When the analysis system 1 exists in the cloud, the display device 9 may be a display device of a terminal connected to the cloud.

The data collection unit 2 is realized by the CPU (Central Processing Unit) of a computer that operates according to the analysis program and the communication interface of the computer, for example. For example, the CPU can read the analysis program from a program storage medium such as a program storage device, etc. of the computer, and operate as the data collection unit 2 according to the analysis program and using the communication interface. In addition, the fact generation unit 4, analysis unit 6, calculation unit 12 and display control unit 8 can be realized by the CPU of the computer operating according to the analysis program, for example. For example, the CPU reads the analysis program from the program recording medium as described above, and operates as the fact generation unit 4, analysis unit 6, calculation unit 12 and display control unit 8 according to the analysis program. For example, the data storage unit 3, the analysis rule storage unit 5, the pattern table storage unit 11 and the attack pattern storage unit 7 are realized by the storage device provided by the computer.

Figure 13:
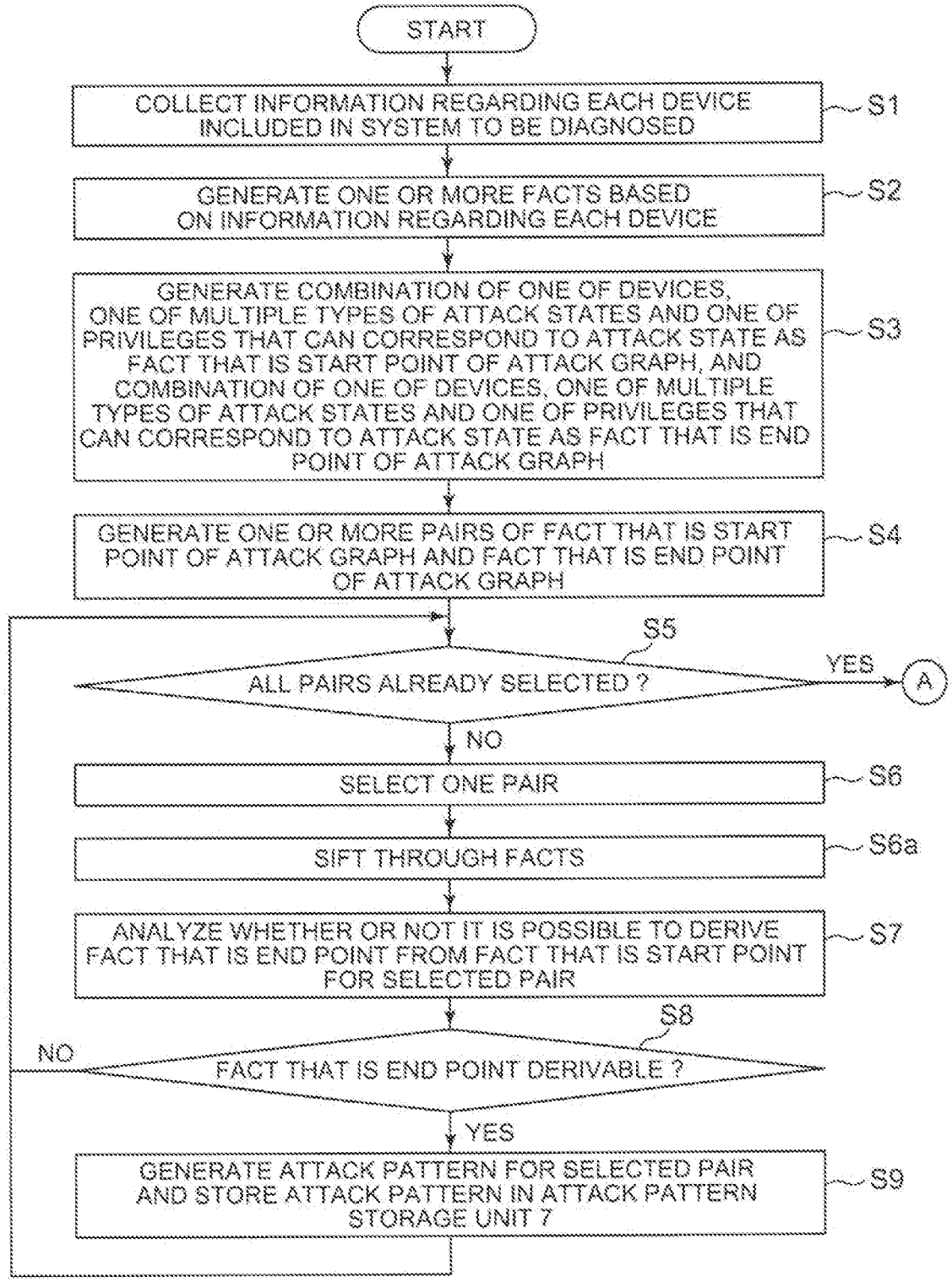
FIG. 13 It depicts a flowchart showing an example of the processing process of an analysis system of the first example embodiment of the present invention.
Figure 14:
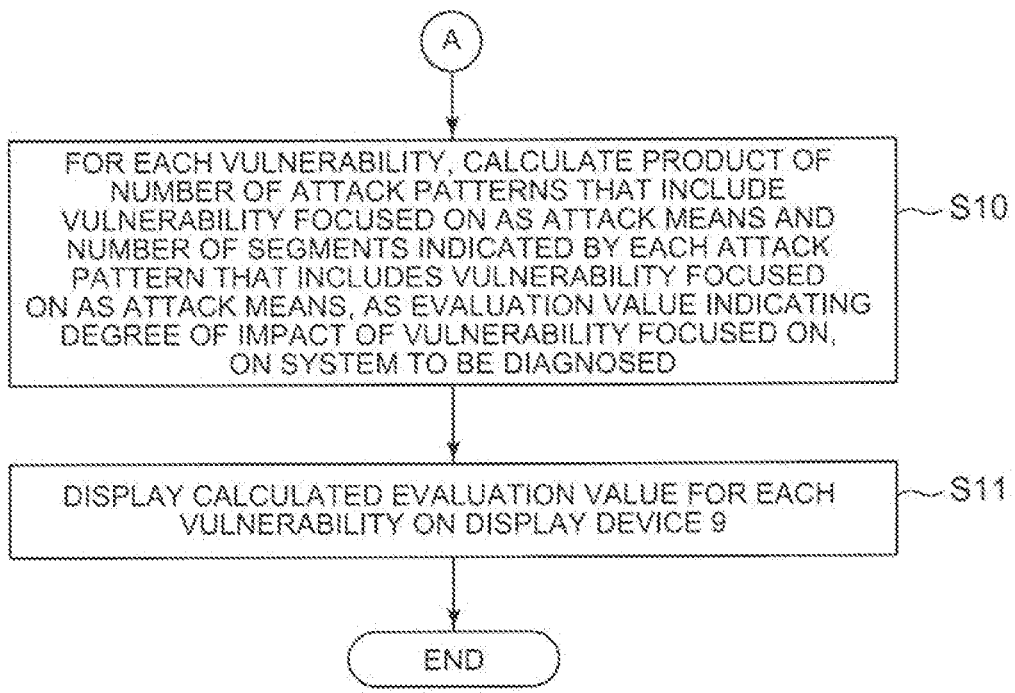
FIG. 14 It depicts a flowchart showing an example of the processing process of an analysis system of the first example embodiment of the present invention.

Next, the processing process will be described. FIGS. 13 and 14 are flowcharts showing an example of the processing process of the analysis system of the first example embodiment of the present invention. The matters already explained are omitted.

First, the data collection unit 2 collects information regarding each device included in the system to be diagnosed (step S1). The data collection unit 2 stores the collected data in the data storage unit 3.

In addition, in step S1, the data collection unit 2 collects information on the vulnerability that exists in each device included in the system to be diagnosed. Then, the data collection unit 2 puts the collected vulnerability information into a table of vulnerability information (refer to FIG. 3), which consists of records keyed by the vulnerability identification information, for example, and stores the table in the data storage unit 3. The format of storing each vulnerability information in the data storage unit 3 is not limited to the table format illustrated in FIG. 3.

Next to step S1, the fact generation unit 4 generates one or more facts based on the information regarding each device (step S2).

Next, the analysis unit 6 generates a combination of one of the devices, one of the multiple types of attack states, and one of the privileges that can correspond to the attack state as the fact that is the start point of the attack graph. Similarly, the analysis unit 6 generates a combination of one of the devices, one of the multiple types of attack states, and one of the privileges that can correspond to the attack state as a fact that is the end point of the attack graph (step S3).

Next, the analysis unit 6 generates one or more pairs of a fact that is the start point of the attack graph and a fact that is the end point of the attack graph (step S4).

Next, the analysis unit 6 determines whether all the pairs generated in step S4 have already been selected in step S6 (step S5). When there are unselected pairs (No in step S5), the process moves to step S6. When the process first moves to step S5 from step S4, not a single pair has been selected. Therefore, in this case, the process moves to step S6.

In step S6, the analysis unit 6 selects one of the pairs generated in step S4 that has not yet been selected.

Following step S6, the analysis unit 6 sifts through the facts (step S6*a*). In step S6*a*, the analysis unit 6 selects facts to be used in the analysis of step S7, and does not select facts that are not used in the analysis of step S7. Specifically, the analysis unit 6 selects the fact generated from the information regarding the device that is the start point and the information regarding the device that is the end point, and the fact that is the start point. The analysis unit 6 does not select a fact generated based on information regarding a device that does not correspond to either the device that is the start point or the device that is the end point. The fact generated based on information regarding a device that does not correspond to either the device that is the start point or the device that is the end point is not used in the analysis of step S7.

After step S6*a*, the analysis unit 6 analyzes whether or not it is possible to derive the fact that is the end point from the fact that is the start point for the selected pair (step S7). At the start of step S7, the analysis unit 6 regards a fact generated from the information regarding the device that is the start point and the information regarding the device that is the end point, and the fact that is the start point (i.e., the fact selected in step S6*a*) as the existing facts (facts for reference). Then, when the analysis unit 6 derives a new fact based on the analysis rule, the analysis unit 6 adds the new fact to the above existing facts (facts for reference). The analysis unit 6 analyzes whether or not it is possible to derive the fact that is the end point by repeating the derivation of a new fact based on the existing facts (facts for reference) and the analysis rule. When the fact that is the end point in the selected pair cannot be obtained even after repeating the derivation of a new fact until no new facts can be derived, the analysis unit 6 determines that the fact that is the end point cannot be derived from the fact that is the start point.

When the fact that is the end point cannot be derived from the fact that is the start point (No of step S8), the analysis unit 6 repeats the process from step S5.

When the fact that is the end point can be derived from the fact that is the start point (Yes of step S8), the analysis unit 6 generates an attack pattern for the selected pair and stores the attack pattern in the attack pattern storage unit 7 (step S9). After step S9, the analysis unit 6 repeats the process from step S5.

When the analysis unit 6 determines that all the pairs generated in step S4 have already been selected in step S6 (Yes of step S5), the calculation unit 12 calculates, for each vulnerability, a product of the number of the attack patterns that include the vulnerability focused on as the attack means and the number of the segments indicated by each attack pattern that includes the vulnerability focused on as the attack means, as the evaluation value indicating the degree of impact of the vulnerability focused on, on the system to be diagnosed (step S110).

Next, the display control unit 8 displays the calculated evaluation value for each vulnerability on the display device 9 (step S11). At this time, the display control unit 8 may display the evaluation value for each vulnerability along with the information of each vulnerability collected by the data collection unit 2. For example, suppose that the data collection unit 2 stores the table illustrated in FIG. 3 in the data storage unit 3 in step S1 as described above. In this case, the display control unit 8 may display on the display device 9 a table (i.e., the table illustrated in FIG. 12) in which a column indicating an evaluation value is added to the table illustrated in FIG. 3.

According to the present example embodiment, the calculation unit 12 calculates the evaluation value, for each vulnerability, based on the number of the attack patterns that include the vulnerability focused on as the attack means and the number of the segments indicated by each attack pattern that includes the vulnerability focused on as the attack means. The greater the number of attack patterns that includes the vulnerability focused on as the attack means, the more vulnerable the system to be diagnosed is to various types of attacks using the vulnerability. In addition, the greater the number of segments indicated by each attack pattern that includes the vulnerability focused on as the attack means, the more vulnerable the system to be diagnosed is to attacks using the vulnerability. Therefore, in the present example embodiment, since the calculation unit 12 calculates the evaluation value, for each vulnerability, based on the number of the attack patterns that include the vulnerability focused on as the attack means and the number of the segments indicated by each attack pattern that includes the vulnerability focused on as the attack means, it is possible to analyze the impact of each vulnerability on each individual system to be diagnosed.

In the example embodiment of the present invention, the calculation unit 12 may calculate, for each vulnerability, the number of the attack patterns that include the vulnerability as the attack means itself as the evaluation value. However, it is preferable to calculate the evaluation value using not only the number of the attack patterns that include the vulnerability as the attack means, but also the number of the segments indicated by each attack pattern that includes the vulnerability as the attack means, as described above. The reason for this is explained below. As mentioned above, the greater the number of attack patterns that include some kind of vulnerability as the attack means, the more vulnerable the system to be diagnosed is to various types of attacks using the vulnerability. However, even if the number of attack patterns is great in that way, when the number of the segments indicated by each attack pattern that includes the vulnerability as the attack means is small (for example, one), the number of attack points using the vulnerability is small (for example, only one). In such a case, if the number of attack patterns itself is used as the evaluation value, the impact of the vulnerability on the system to be diagnosed will be evaluated larger than the actual impact. Accordingly, it is better to calculate the evaluation value based on the number of the attack patterns that include the vulnerability as the attack means and the number of the segments indicated by each attack pattern that includes the vulnerability as the attack means, as shown in the above example embodiment, to more appropriately evaluate the impact of the vulnerability on the system to be diagnosed. Therefore, it is preferable to calculate the evaluation value using not only the number of the attack patterns that include the vulnerability as the attack means, but also the number of the segments indicated by each attack pattern that includes the vulnerability as the attack means.

The method by which the analysis unit 6 generates attack patterns is not limited to the method described in the above example embodiment. As already explained, the analysis unit 6 may use a model checker to generate the attack pattern. Alternatively, the analysis unit 6 may generate the attack pattern by analyzing using Petri net.

Example Embodiment 2

Figure 15:
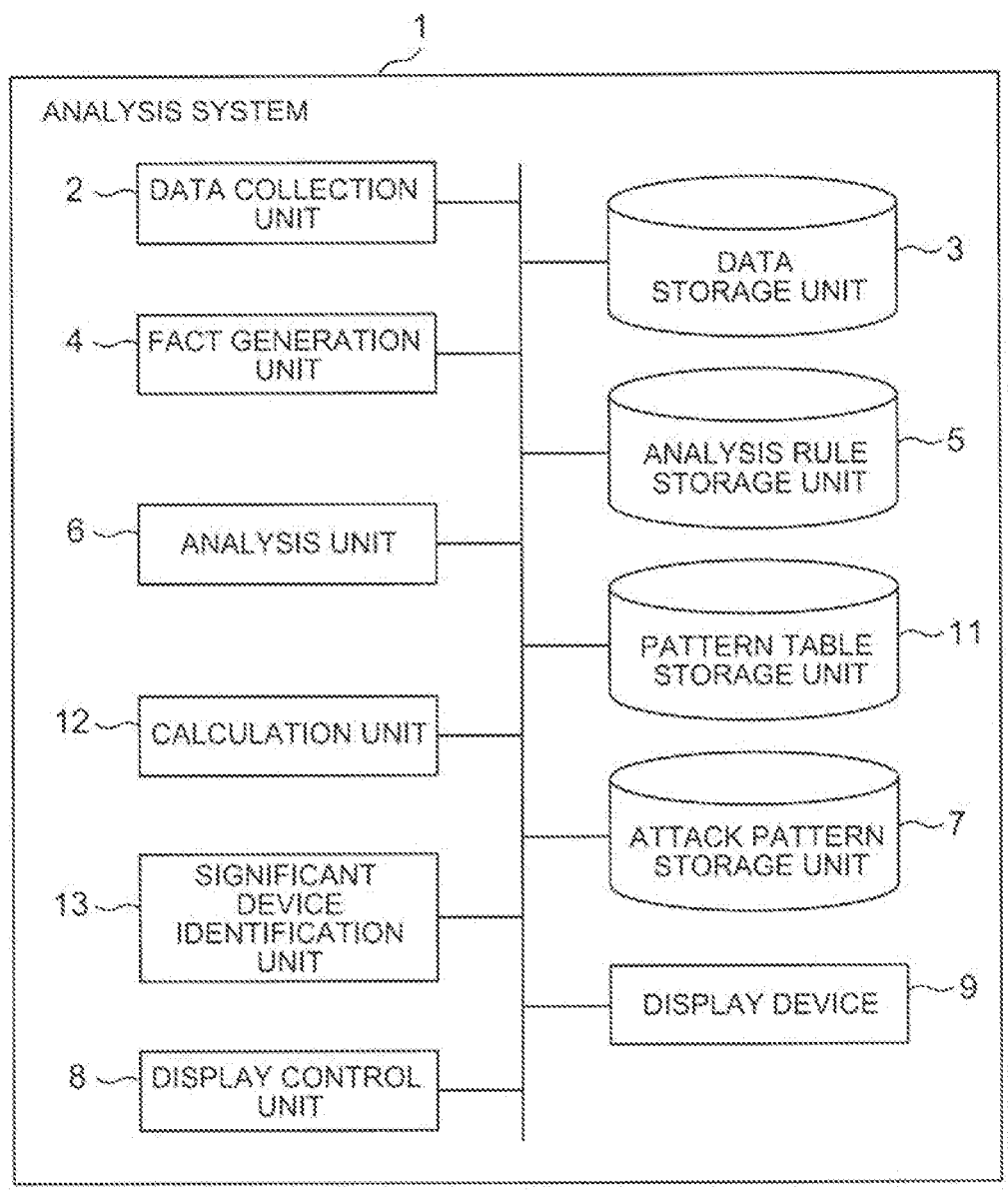
FIG. 15 It depicts a block diagram showing an example of an analysis system of the second example embodiment of the present invention.

FIG. 15 shows a block diagram showing an example of an analysis system of the second example embodiment of the present invention. The same matters as in the first example embodiment are omitted from the description. The analysis system 1 of the second example embodiment of the present invention comprises a significant device identification unit 13 in addition to each element provided by the analysis system 1 of the first example embodiment (refer to FIG. 2).

In the first example embodiment described above, the calculation unit 12 calculates the evaluation value based on the number of the attack patterns that include the vulnerability as the attack means and the number of the segments indicated by each attack pattern that includes the vulnerability as the attack means. Alternatively, the calculation unit 12 calculates the number of the attack patterns that include the vulnerability as the attack means itself as the evaluation value. In the analysis system 1 of the second example embodiment, the calculation unit 12 corrects the evaluation value calculated in such a way.

The significant device identification unit 13 identifies a significant device from among the devices included in the system to be diagnosed. Here, the significant device is a device that is significant in the system to be diagnosed and that is undesirable to be attacked. The security administrator (hereinafter, referred to as "administrator") can decide in advance what type of device is the significant device. There may be multiple types that fall under the category of significant devices. There may be multiple devices that fall under the significant devices in a single system to be diagnosed.

The significant device identification unit 13 may identify a significant device by receiving the designation of device that corresponds to the significant device from the administrator through a user interface (not shown) among the devices included in the system to be diagnosed, for example.

Alternatively, the significant device identification unit 13 may identify a significant device based on the information regarding each device collected by the data collection unit 2, without being specified by the administrator. In this case, the condition applicable to the significant device can be predetermined. Then, based on the information regarding each device, the significant device identification unit 13 may identify a device from among the devices that satisfies the predetermined condition (condition applicable to the significant device) and identify that device as the significant device.

The significant device identification unit 13 may identify the significant device before the calculation unit 12 calculates the evaluation value for each vulnerability.

The significant device identification unit 13 is realized by a CPU of the computer that operates according to an analysis program, for example. For example, the CPU can read the analysis program from the program recording medium and operate as the significant device identification unit 13 according to the program.

In the second example embodiment, the calculation unit 12 calculates the evaluation value for each vulnerability in step S10. At this time, the calculation unit 12 first calculates the evaluation value based on the number of the attack patterns that include the vulnerability as the attack means and the number of the segments indicated by each attack pattern that includes the vulnerability as the attack means, or the calculation unit 12 calculates the number of the attack patterns that include the vulnerability as the attack means d itself as the evaluation value. This calculation process is the same as the calculation process described in the first example embodiment.

Further, in the second example embodiment, when the calculation unit 12 calculates the evaluation value for each vulnerability, if there is a segment that leads to a significant device among the segments indicated by each attack pattern that includes the vulnerability focused on as the attack means, the calculation unit 12 corrects the calculated evaluation value to increase the calculated evaluation value.

For example, suppose that the attack pattern shown in FIG. 11 is generated. Then, as explained in the first example embodiment, suppose that the calculation unit 12 calculates "12", "6", "2" and "1" as evaluation values of the vulnerabilities "CVE-YYYY-1111", "CVE-YYYY-2222", "CVE-YYYY-3333" and "CVE-YYYY-4444", respectively.

Furthermore, suppose that the segment "S4" indicated by the attack pattern "P3" in FIG. 11 is the segment leading to the device identified as the significant device by the significant device identification unit 13, and the other segments "S1", "S2" and "S3" are not segments that lead to the significant device.

In this case, the calculation unit 12 corrects the evaluation values of the vulnerabilities "CVE-YYYY-1111", "CVE-YYYY-2222" and "CVE-YYYY-4444" defined as attack means in the attack pattern "P3" shown in FIG. 11 so that calculated values "12", "6" and "1" are increased, respectively. The method of correcting the calculated evaluation values so as to increase them is not particularly limited. For example, the calculation unit 12 may add a positive constant to the evaluation value to be corrected. Alternatively, the calculation unit 12 may multiply the evaluation value to be corrected by a constant greater than one.

According to the present example embodiment, if there is a segment that leads to a significant device among the segments indicated by each attack pattern that includes the vulnerability as the attack means, the calculation unit 12 corrects the calculated evaluation value to increase the calculated evaluation value. Thus, the degree of impact of the vulnerability on the system to be diagnosed can be evaluated according to whether the attack using the vulnerability is an attack leading to the significant device or not.

Example Embodiment 3

A configuration example of the analysis system of the third example embodiment of the present invention can be represented as illustrated in FIG. 2, as with the analysis system 1 of the first example embodiment. Therefore, the third example embodiment will be described with reference to FIG. 2.

In the first example embodiment described above, the calculation unit 12 calculates the evaluation value based on the number of the attack patterns that include the vulnerability as the attack means and the number of the segments indicated by each attack pattern that includes the vulnerability as the attack means, or the calculation unit 12 calculates the number of the attack patterns that include the vulnerability as the attack means d itself as the evaluation value. In the analysis system 1 of the third example embodiment, the calculation unit 12 corrects the evaluation value calculated in such a way. This is the same as the second example embodiment in that the calculation unit 12 corrects the evaluation value.

In the third example embodiment, when the calculation unit 12 calculates the evaluation value for each vulnerability, when the attack result in the attack pattern that includes the vulnerability focused on as the attack means includes a predetermined attack state, the calculation unit 12 corrects the calculated evaluation value to increase the calculated evaluation value. In the following explanation, the case where the predetermined attack state is "arbitrary code execution" is used as an example, but the predetermined attack state can be an attack state other than "arbitrary code execution".

For example, suppose that the attack pattern shown in FIG. 11 is generated. Then, as explained in the first example embodiment, suppose that the calculation unit 12 calculates "12", "6", "2" and "1" as evaluation values of the vulnerabilities "CVE-YYYY-1111", "CVE-YYYY-2222", "CVE-YYYY-3333" and "CVE-YYYY-4444", respectively.

Then, among the attack patterns shown in FIG. 11, the attack result within the attack pattern "P3" that includes vulnerabilities "CVE-YYYY-1111", "CVE-YYYY-2222" and "CVE-YYYY-4444" as the attack means includes the attack state "arbitrary code execution". Therefore, in the present example, the calculation unit 12 corrects the evaluation values of the vulnerabilities "CVE-YYYY-1111", "CVE-YYYY-2222" and "CVE-YYYY-4444" defined as attack means in the attack pattern "P3" shown in FIG. 11 so that calculated values "12", "6" and "1" are increased, respectively.

The method of correcting the calculated evaluation values so as to increase them is not particularly limited. For example, the calculation unit 12 may add a positive constant to the evaluation value to be corrected. Alternatively, the calculation unit 12 may multiply the evaluation value to be corrected by a constant greater than one. This point is the same as in the second example embodiment.

According to this system, the degree of impact of the vulnerability on the system to be diagnosed can be evaluated, taking into account the attack state in the attack result using the vulnerability.

Next, various modifications of the above example embodiments will be explained.

In each example embodiment, the display control unit 8 displays the calculated evaluation value for each vulnerability on the display device 9. At this time, the display control unit 8 may also display various information regarding the vulnerability for each vulnerability in addition to the evaluation value, as illustrated in FIG. 12. Furthermore, the display control unit 8 may also display on the display device 9 the segment shown in each attack pattern that includes the vulnerability as an attack means, for each vulnerability. An example of the display in this case is shown in FIG. 16. FIG. 16 illustrates the case where the identification information of each segment is displayed as each segment.

In addition, the display control unit 8 may display the network topology of the devices included in the system to be diagnosed on the display device 9, along with the information illustrated in FIG. 16. Further, the identification information of the segment may be displayed in the vicinity of the segment shown in the network topology. FIG. 17 shows an example of such a display. In FIG. 17, some of the segments are omitted for simplicity of the drawing. For example, the segment "S1" from Host 1 to Host 2 is shown, but the segment in the opposite direction (from Host 2 to Host 1) is not shown. The segment from a device to itself is also not shown.

The display illustrated in FIG. 17 allows the administrator to know specifically which segment in the system to be diagnosed is the segment indicated by the identification information in the table.

Figure 18:
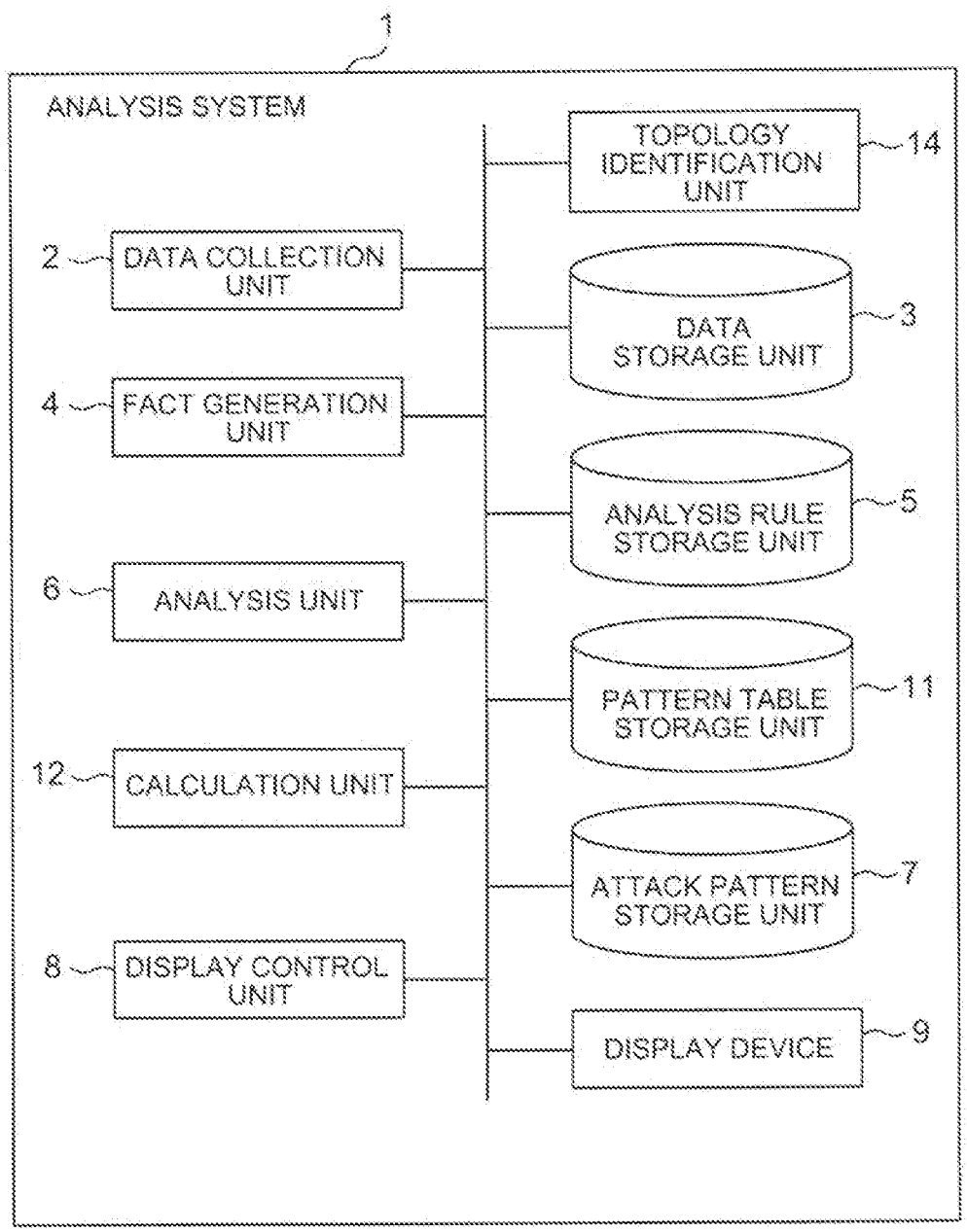
FIG. 18 It depicts a block diagram showing a modification of the analysis system of the example embodiment of the present invention.

In the case of the display illustrated in FIG. 17, the analysis system 1 comprises a topology identification unit 14, as illustrated in FIG. 18. The topology identification unit 14 identifies the network topology of each device included in the system to be diagnosed. Specifically, the topology identification unit 14 may identify the network topology of each device based on a configuration of the network topology given by the administrator. Alternatively, the topology identifying unit 14 may identify the network topology of each device based on the information regarding each device stored in the data storage unit 3.

The topology identification unit 14 is realized, for example, by the CPU of a computer that operates according to the analysis program. For example, the CPU can read the analysis program from the program recording medium and operate as the topology identification unit 14 according to the program.

The display control unit 8 may display the network topology identified by the topology identification unit 14 on the display device 9, as illustrated in FIG. 17.

Next, another variation will be explained. In each of the above example embodiments, it has been explained that the analysis unit 6 generates a combination of one of the devices, one of the multiple types of attack states, and one of the privileges that can correspond to the attack target as the fact that is the start point or the fact that is the end point of the attack graph. When generating the fact that is the start point and the fact that is the end point of the attack graph, the analysis unit 6 does not include the privileges in the combination, but instead generates a combination of one of the devices and one of the multiple types of attack states as the fact that is the start point or the fact that is the end point. In other words, each of the fact that is the start point and the fact that is the end point may be at least a pair of a device and an attack state. In this case, the analysis unit 6 may generate a combination of one of the devices and one of the multiple attack states as the fact that is the start point of the attack graph and a combination of one of the devices and one of the multiple attack states as the fact that is the end point of the attack graph.

According to the present modification, the analysis unit 6 can perform the process faster because the privileges are excluded from the combinations that correspond to the fact that is the start point and the fact that is the end point. As a result, the process until the evaluation value for each vulnerability is displayed can be completed more quickly.

The analysis unit 6 may first generate combinations that exclude privileges as the fact that is the start point and the fact that is the end point, analyze whether it is possible to derive the fact that is the end point from the fact that is the start point, and when it is determined that it is possible to derive the fact that is the end point from the fact that is the start point, the analysis unit 6 may newly generate a combination including the device, attack state, and privileges for the fact that is the start point and the fact that is the end point. Then, the analysis unit 6 may analyze whether or not it is possible to derive the fact that is the end point from the fact that is the start point again. This process can efficiently generate an attack pattern while preventing redundant analysis that may occur when generating a combination that excludes privileges for the fact that is the start point or the fact that is the end point.

Figure 19:
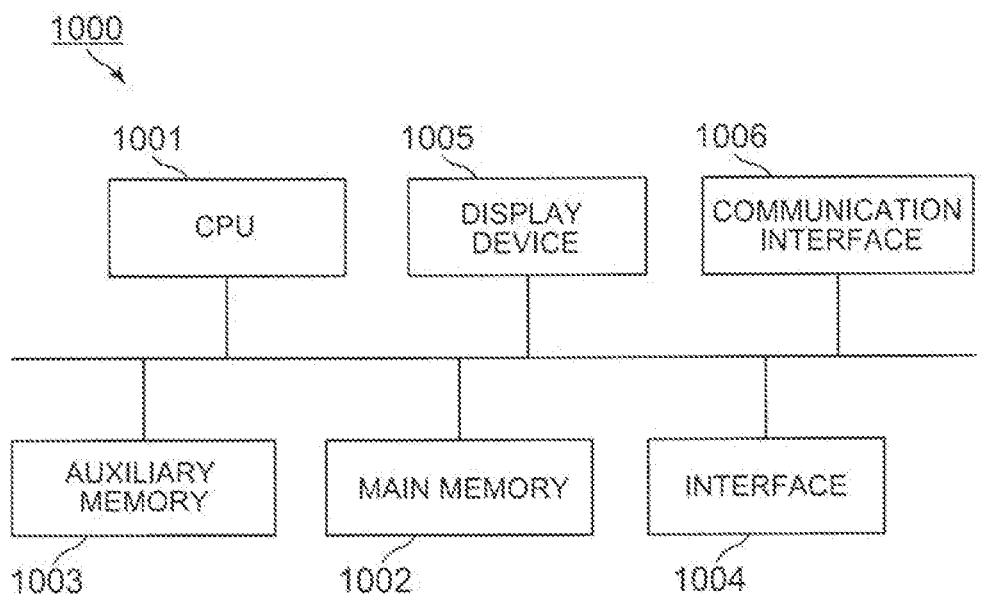
FIG. 19 It depicts a schematic block diagram of a configuration example of a computer for an analysis system of each example embodiment of the present invention.

FIG. 19 is a schematic block diagram of a configuration example of a computer for an analysis system of each example embodiment of the present invention. The computer comprises a CPU 1001, a main memory 1002, an auxiliary memory 1003, an interface 1004, a display device 1005 and a communication interface 1006.

The analysis system 1 of each example embodiment of the present invention is realized by a computer 1000. The operation of the analysis system 1 is stored in the auxiliary memory 1003 in the form of an analysis program. The CPU 1001 reads the analysis program from the auxiliary memory 1003, deploys the program to the main memory 1002, and executes the processes described in the above example embodiments according to the analysis program.

The auxiliary memory 1003 is an example of a non-transitory tangible medium. Other examples of non-transitory tangible media are a magnetic disk, an optical magnetic disk, a CD-ROM (Compact Disk Read Only Memory), a DVD-ROM (Digital Versatile Disk Read Only Memory), a semiconductor memory, and the like, which are connected through the interface 1004. When the program is delivered to the computer 1000 through a communication line, the computer 1000 that receives the delivery may develop the program into the main memory 1002 and operate according to the program.

Some or all of the components may be realized by general-purpose or dedicated circuitry, processors, or a combination of these. They may be configured by a single chip or by multiple chips connected through a bus. Some or all of the components may be realized by a combination of the above-mentioned circuitry, etc. and a program.

When some or all of each component is realized by multiple information processing devices, circuits, etc., the multiple information processing devices, circuits, etc. may be centrally located or distributed. For example, the information processing devices, circuits, etc. may be implemented as a client-and-server system, cloud computing system, etc., each of which is connected through a communication network.

Figure 20:
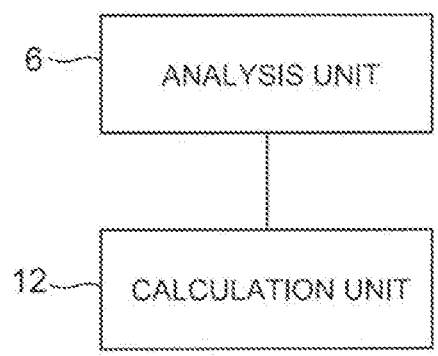
FIG. 20 It depicts a block diagram showing a summarized analysis system of the present invention.

Next, a summary of the present invention will be described. FIG. 20 is a block diagram showing a summarized analysis system of the present invention. The analysis system of the present invention comprises an analysis unit 6 and a calculation unit 12.

The analysis unit 6 generates an attack pattern that includes an attack condition, an attack result, an attack means that is vulnerability that is used by an attack, and a segment where the attack can occur in a system to be diagnosed.

The calculation unit 12 calculates an evaluation value, for each vulnerability, which indicates degree of impact of the vulnerability on the system to be diagnosed. Specifically, the calculation unit 12 calculates the evaluation value, for each vulnerability, based on the number of the attack patterns that include the vulnerability focused on as the attack means and the number of the segments indicated by each attack pattern that includes the vulnerability focused on as the attack means.

With such a configuration, it is possible to analyze the impact of vulnerability on individual systems.

The calculation unit 12 may be configured to calculate the evaluation value for each vulnerability as a product of the number of attack patterns that include the vulnerability focused on as an attack means and the number of segments indicated by each attack pattern that includes the vulnerability focused on as an attack means.

The calculation unit 12 may be configured to correct the calculated evaluation value so that the calculated evaluation value is increased if there is a segment that leads to a significant device among the segments indicated by each attack pattern that includes the vulnerability focused on as the attack means.

The attack condition and the attack result are each expressed as a combination of one of predetermined multiple types of attack states and one of privileges that can correspond to the attack state, and the calculation unit 12 may be configured to correct the calculated evaluation value so that the calculated evaluation value is increased when the attack result in the attack pattern that includes the vulnerability focused on as the attack means includes a predetermined attack state.

The display control unit (for example, display control unit 8), which displays the calculated evaluation values for each vulnerability on a display device (for example, display device 90), may be provided.

Although the invention of the present application has been described above with reference to the example embodiments, the present invention is not limited to the above example embodiments. Various changes can be made to the configuration and details of the present invention that can be understood by those skilled in the art within the scope of the present invention.

INDUSTRIAL APPLICABILITY

The present invention is suitably applied to an analysis system that analyzes attacks on systems to be diagnosed.

REFERENCE SIGNS LIST

1 Analysis system
2 Data collection unit
3 Data storage unit
4 Fact generation unit
5 Analysis rule storage unit
6 Analysis unit
7 Attack pattern storage unit
8 Display control unit
9 Display device
11 Pattern table storage unit
12 Calculation unit
13 Significant device identification unit

What is claimed is:
1. An analysis system comprising:
a memory storing instructions; and
a processor configured to execute the instructions to:
perform an active scan on each of a plurality of devices in a system to be diagnosed, to collect information regarding each device;
identify identification information of a plurality of vulnerabilities present in the plurality of devices based on the collected information regarding each device;
collect data from a vulnerability database server using the identified identification information;
generate, based on the collected data, a plurality of attack patterns that each include an attack condition, an attack result, an attack means that is one of the plurality of vulnerabilities used by an attack, and one of a plurality of segments where the attack occurs in the system to be diagnosed;
calculate an evaluation value for each vulnerability, which indicates a degree of impact of the vulnerability on the system to be diagnosed; and
display the calculated evaluation value for each vulnerability,
wherein the processor calculates the evaluation value for each vulnerability, based on a number of attack patterns that include the vulnerability, and based on a number of the segments indicated by each attack pattern that includes the vulnerability, and
wherein each segment is a path between a corresponding device and other devices in the system to be diagnosed, or from the corresponding device back to the corresponding device.

2. The analysis system according to claim 1, wherein
the processor calculates, for each vulnerability, a product of the number of attack patterns that include the vulnerability and the number of segments indicated by each attack pattern that includes the vulnerability, as the evaluation value.

3. The analysis system according to claim 1, wherein
in a case in which, of the plurality of segments indicated by each attack pattern that includes the vulnerability, a segment leads to a given device the processor corrects the calculated evaluation value so that the calculated evaluation value is increased.

4. The analysis system according to claim 1, wherein
the attack condition and the attack result of each attack pattern are each expressed as a combination of one of predetermined multiple types of attack states and one of privileges that respectively correspond to the attack states, and
when the attack result in each attack pattern that includes the vulnerability includes a predetermined attack state, the processor corrects the calculated evaluation value so that the calculated evaluation value is increased.

5. The analysis system according to claim 1, wherein
the processor displays the calculated evaluation value for each vulnerability on a display device.

6. An analysis method performed by one or more computers and comprising:
performing an active scan on each of a plurality of devices in a system to be diagnosed, to collect information regarding each device;
identifying identification information of a plurality of vulnerabilities present in the plurality of devices based on the collected information regarding each device;
collecting data from a vulnerability database server using the identified identification information;
generating, based on the collected data, a plurality of attack patterns that each include an attack condition, an attack result, an attack means that is one of the plurality of vulnerabilities used by an attack, and one of a plurality of segments where the attack occurs in the system to be diagnosed;
calculating an evaluation value for each vulnerability, which indicates a degree of impact of the vulnerability on the system to be diagnosed; and
displaying the calculated evaluation value for each vulnerability,
wherein the evaluation value is calculated for each vulnerability, based on a number of attack patterns that include the vulnerability, and based on a number of the segments indicated by each attack pattern that includes the vulnerability, and
wherein each segment is a path between a corresponding device and other devices in the system to be diagnosed, or from the corresponding device back to the corresponding device.

7. A non-transitory computer-readable recording medium storing an analysis program executable by a computer to perform processing comprising:
performing an active scan on each of a plurality of devices in a system to be diagnosed, to collect information regarding each device;
identifying identification information of a plurality of vulnerabilities present in the plurality of devices based on the collected information regarding each device;
collecting data from a vulnerability database server using the identified identification information;
generating, based on the collected data, a plurality of attack patterns that each include an attack condition, an attack result, an attack means that is one of the plurality of vulnerabilities used by an attack, and one of a plurality of segments where the attack occurs in the system to be diagnosed;
calculating an evaluation value for each vulnerability, which indicates a degree of impact of the vulnerability on the system to be diagnosed; and
displaying the calculated evaluation value for each vulnerability,
wherein the evaluation value is calculated for each vulnerability, based on a number of attack patterns that include the vulnerability, and based on a number of the segments indicated by each attack pattern that includes the vulnerability, and
wherein each segment is a path between a corresponding device and other devices in the system to be diagnosed, or from the corresponding device back to the corresponding device.

* * * * *